United States Patent
Lee et al.

(10) Patent No.: US 12,460,029 B2
(45) Date of Patent: Nov. 4, 2025

(54) POLYOLEFIN

(71) Applicant: LG CHEM, LTD., Seoul (KR)

(72) Inventors: Jinyoung Lee, Daejeon (KR); Donghyeon Gwon, Daejeon (KR); Yoonchul Jung, Daejeon (KR); Chaeeun Lee, Daejeon (KR); Byung Seok Kim, Daejeon (KR); Jeongkyu Lee, Daejeon (KR); Seok Bin Hong, Daejeon (KR); Seyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 435 days.

(21) Appl. No.: 18/011,518

(22) PCT Filed: Oct. 28, 2021

(86) PCT No.: PCT/KR2021/015308
§ 371 (c)(1),
(2) Date: Dec. 19, 2022

(87) PCT Pub. No.: WO2022/108167
PCT Pub. Date: May 27, 2022

(65) Prior Publication Data
US 2023/0312788 A1 Oct. 5, 2023

(30) Foreign Application Priority Data

Nov. 17, 2020 (KR) .......... 10-2020-0154033
Oct. 27, 2021 (KR) .......... 10-2021-0144836

(51) Int. Cl.
C08F 10/02 (2006.01)
C08F 4/659 (2006.01)
C08F 210/16 (2006.01)

(52) U.S. Cl.
CPC ........ *C08F 210/16* (2013.01); *C08F 4/65916* (2013.01); *C08F 10/02* (2013.01)

(58) Field of Classification Search
None
See application file for complete search history.

(56) References Cited

U.S. PATENT DOCUMENTS

2007/0260025 A1 11/2007 Elder et al.
2018/0163153 A1 6/2018 Cain et al.
2019/0127501 A1 5/2019 Wang et al.
(Continued)

FOREIGN PATENT DOCUMENTS

CN 106632779 A 5/2017
CN 110234746 A 9/2019
(Continued)

OTHER PUBLICATIONS

International Search Report (with translation) and Written Opinion dated Feb. 10, 2022, issued in corresponding International Patent Application No. PCT/KR2021/015308.
(Continued)

*Primary Examiner* — Richard A. Huhn
(74) *Attorney, Agent, or Firm* — Morgan, Lewis & Bockius LLP

(57) ABSTRACT

This invention relates to polyolefin. More specifically, this invention relates to polyolefin that may exhibit improved mechanical properties such as excellent drop impact strength.

12 Claims, 1 Drawing Sheet

(56) References Cited

U.S. PATENT DOCUMENTS

| | | | |
|---|---|---|---|
| 2021/0002463 A1 | | 1/2021 | Jeon et al. |
| 2021/0332169 A1 | | 10/2021 | Lee et al. |
| 2021/0395411 A1 | * | 12/2021 | Lee .................... C08F 210/16 |
| 2022/0064344 A1 | | 3/2022 | Jeong et al. |
| 2022/0372199 A1 | * | 11/2022 | Lee .................... C08F 297/083 |

FOREIGN PATENT DOCUMENTS

| | | | | |
|---|---|---|---|---|
| CN | 110724330 A | | 1/2020 | |
| KR | 10-2018-0067939 A | | 6/2018 | |
| KR | 10-2019-0010563 A | | 1/2019 | |
| KR | 10-2019-0071187 A | | 6/2019 | |
| KR | 10-2019-0076136 A | | 7/2019 | |
| KR | 20190076136 A | * | 7/2019 | ............ C08F 4/6428 |
| KR | 10-2019-0110961 A | | 10/2019 | |
| KR | 10-2020-0075963 A | | 6/2020 | |
| KR | 10-2020-0078145 A | | 7/2020 | |
| KR | 10-2020-0093302 A | | 8/2020 | |
| KR | 20200093302 A | * | 8/2020 | ................ C08F 2/38 |

OTHER PUBLICATIONS

Ryabov et al., "Zirconium Complexes with Cyclopentadienyl Ligands Involving Fused a Thiophene Fragment," Organometallics, 2002, vol. 21, No. 14, pp. 2842-2855.

Zhang et al., "Polydispersity of Ethylene Sequence Length in Metallocenea Ethylene/a-Olefin Copolymers. I Characterized by Thermal-Fractionation Technique," Journal of Polymer Science Part B, Polymer Physics, 2002, vol. 40, pp. 813-821.

Meng et al., "The Effect of Comonomer Type and Content on the Properties of Ziegler-Natta Bimodal High-Density Polyethylene," Journal of the Korean Chemical Society, 2011, vol. 55, No. 4, 673-679.

Office Action dated Jul. 7, 2025 issued in corresponding Korean Patent Application No. 10-2020-0172474.

* cited by examiner

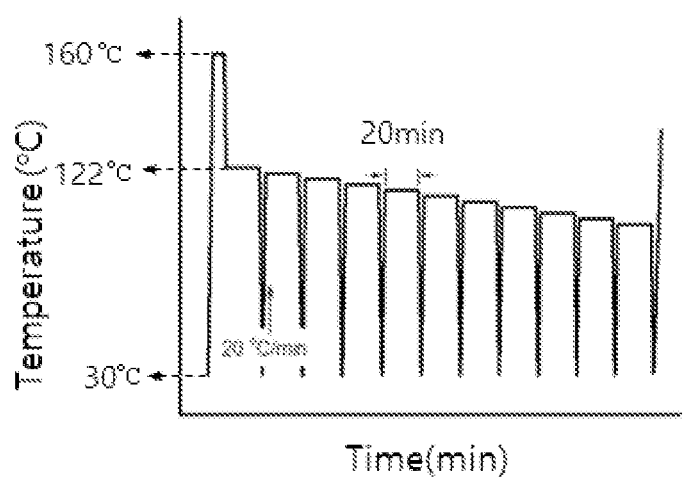

POLYOLEFIN

CROSS-REFERENCE TO RELATED APPLICATION

This application claims the benefit of Korean Patent Application No. 10-2020-0154033 filed on Nov. 17, 2020, and Korean Patent Application No. 10-2021-0144836 filed on Oct. 27, 2021, with the Korean Intellectual Property Office, the disclosures of which are herein incorporated by reference in their entirety.

BACKGROUND OF THE INVENTION

(A) Field of the Invention

This invention relates to polyolefin. More specifically, this invention relates to polyolefin that may exhibit improved mechanical properties such as excellent drop impact strength.

(b) Description of the Related Art

Linear low-density polyethylene (LLDPE) is prepared by copolymerization of ethylene and alpha olefin at low pressure using a polymerization catalyst, and it has narrow molecular weight distribution and short chain branches of a certain length and does not have long chain branches. A linear low density polyethylene film has high elongation and breaking strength, and excellent tear strength and drop impact strength, as well as general properties of polyethylene, and thus, the use is increasing in stretch films, overlap films, and the like, for which the existing low-density polyethylene or high-density polyethylene cannot be applied.

However, linear low-density polyethylene has poor blown film processability and low transparency as compared with excellent mechanical properties. The blown film is a film prepared by blowing air into molten plastic to inflate and is also named as an inflation film.

As the density of linear low-density polyethylene is lower, transparency and drop impact strength tend to increase. However, if a lot of comonomers are used to prepare low density polyethylene, fouling may be frequently generated during a slurry polymerization process, and thus, in a slurry polymerization process, products with density of 0.915 g/cm$^3$ or more are mainly produced.

Thus, there is demand for development of polyethylene that has density of 0.915 g/cm$^3$ or more, and yet, can realize transparency and excellent mechanical properties such as drop impact strength.

SUMMARY OF THE INVENTION

In order to solve the problem of the prior art, it is an object of the invention to provide polyolefin that has density of 0.915 g/cm$^3$ or more, and yet, can exhibit improved mechanical properties such as excellent drop impact strength.

In order to achieve the object, there is provided herein polyolefin satisfying the following requirements of 1) to 3):
1) density measured according to ASTM D1505 being 0.915 g/cm$^3$ to 0.930 g/cm$^3$;
2) melt index (MI) measured at 190° C., under load of 2.16 kg according to ASTM D1238 being 0.5 to 1.5 g/10 min; and
3) by SSA (Successive Self-nucleation and Annealing) analysis, a rate of chains having ASL (Average Ethylene Sequence Length) of 22 nm or more being 16 wt % or more based on the total chains, and a rate of chains having ASL (Average Ethylene Sequence Length) of 8 nm or less being 38 wt % or more based on the total chains.

According to the invention, by appropriately controlling the length and distribution of ethylene sequence forming lamellae during polymerization of polyolefin using a metallocene catalyst, polyolefin having optimum ASL (Average Ethylene Sequence Length) rate, density and melt index can be provided.

Thereby, polyolefin having high drop impact strength can be provided.

BRIEF DESCRIPTION OF THE DRAWINGS

FIG. 1 is a graph showing the temperature profile of SSA analysis according to one embodiment of the invention.

DETAILED DESCRIPTION OF THE EMBODIMENTS

As used herein, terms "a first", "a second" and the like are used to explain various constructional elements, and they are used only to distinguish one constructional element from other constructional elements.

And the terms used herein are only to explain specific embodiments and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element, or combinations thereof, and they are not intended to preclude the possibility of existence or addition of one or more other characteristics, numbers, steps, constructional elements, or combinations thereof.

Although various modifications can be made to the invention and the invention may have various forms, specific examples will be illustrated and explained in detail below. However, it should be understood that these are not intended to limit the invention to specific disclosure, and that the present invention includes all the modifications, equivalents, or replacements thereof without departing from the spirit and technical scope of the invention.

Hereinafter, polyolefin of the invention will be explained in detail.

Polyolefin according to one embodiment of the present invention satisfies the following requirements of 1) to 3): 1) density measured according to ASTM D1505 being 0.915 g/cm$^3$ to 0.930 g/cm$^3$; 2) melt index (MI) measured at 190° C., under load of 2.16 kg according to ASTM D1238 being 0.5 to 1.5 g/10 min; and 3) by SSA (Successive Self-nucleation and Annealing) analysis, a rate of chains having ASL (Average Ethylene Sequence Length) of 22 nm or more being 16 wt % or more based on the total chains, and a rate of chains having ASL (Average Ethylene Sequence Length) of 8 nm or less being 38 wt % or more based on the total chains.

Linear low-density polyethylene (LLDPE) is prepared by copolymerization of ethylene and alpha olefin at low pressure using a polymerization catalyst, and has narrow molecular weight distribution, and short chain branch of a certain length. A linear low density polyethylene film has high breaking strength and elongation, excellent tear strength and drop impact strength, as well as general properties of polyethylene, and thus, the use is increasing in stretch films, overlap films, and the like, for which the existing low-density polyethylene or high-density polyethylene cannot be applied.

Meanwhile, it is known that as the density of linear low-density polyethylene is lower, transparency and drop impact strength increases. However, if a lot of comonomers are used to prepare low density polyethylene, fouling may be frequently generated in a slurry polymerization process, and when preparing a film comprising the same, the amount of an antiblocking agent used should be increased due to stickiness. And, the production process may be unstable, or the morphology of produced polyethylene may be deteriorated, thus decreasing bulk density.

Thus, in the present disclosure, there is provided polyolefin that has low density properties, and yet, has optimum ASL (Average Ethylene Sequence Length) rate enabling increase in transparency and drop impact strength, by appropriately controlling the length and distribution of ethylene sequence forming lamellae.

Hereinafter, polyolefin of the invention will be explained in more detail.

1) Density

The polyolefin according to one embodiment of the invention may be low density polyethylene (LDPE) having a density measured according to ASTM D1505 of 0.915 g/cm$^3$ to 0.930 g/cm$^3$.

More specifically, the density of the polyolefin according to one embodiment of the invention may be 0.915 g/cm$^3$ or more, or 0.916 g/cm$^3$ or more, or 0.917 g/cm$^3$ or more, or 0.918 g/cm$^3$ or more, or, 0.919 g/cm$^3$ or more, and 0.930 g/cm$^3$ or less, or 0.928 g/cm$^3$ or less, or 0.925 g/cm$^3$ or less, or 0.922 g/cm$^3$ or less, or 0.921 g/cm$^3$ or less, or 0.920 g/cm$^3$ or less.

Due to the low-density property, it has high fracture strength and elongation, and excellent tear strength, drop impact strength, and the like, and thus, can be usefully used as films for detergent packaging, food packaging, and the like, requiring such properties.

2) Melt Index (MI)

The polyolefin according to one embodiment of the invention has melt index (MI) measured at 190° C. under load of 2.16 kg according to ASTM D1238, of 0.5 to 1.5 g/10 min More specifically, the melt index (MI) of the polyolefin according to one embodiment of the invention may be 0.5 g/10 min or more, or 0.6 g/10 min or more, or 0.7 g/10 min or more, or 0.8 g/10 min or more, or 0.9 g/10 min or more, and 1.5 g/10 min or less, or 1.4 g/10 min or less, or 1.3 g/10 min or less, or 1.2 g/10 min or less, or 1.1 g/10 min or less.

In case a melt index is lower than the above range, it may be difficult to process, and in case a melt index is higher than the above range, mechanical properties of polyolefin resin may be deteriorated.

3) Distribution of ASL (Average Ethylene Sequence Length) Chains by SSA (Successive Self-Nucleation and Annealing) Analysis The polyolefin according to one embodiment of the invention has a rate of chains having ASL (Average Ethylene Sequence Length) of 22 nm or more, of 16 wt % or more, based on the total chains, by SSA (Successive Self-nucleation and Annealing) analysis.

More specifically, in the polyolefin according to one embodiment of the invention, a rate of chains having ASL of 22 nm or more may be 16 wt % or more, or 17 wt % or more, or 18 wt % or more, and 35 wt % or less, or 30 wt % or less, or 28 wt % or less, or 26 wt % or less, or 24 wt % or less, or 22 wt % or less, based on the total chains.

And the polyolefin according to one embodiment of the invention has a rate of chains having ASL (Average Ethylene Sequence Length) of 8 nm or less, of 38 wt % or more, based on the total chains, by SSA (Successive Self-nucleation and Annealing) analysis.

More specifically, in the polyolefin according to one embodiment of the invention, a rate of chains having ASL of 8 nm or less may be 38 wt % or more, or 39 wt % or more, or 40 wt % or more, and 50 wt % or less, or 48 wt % or less, or 46 wt % or less, or 44 wt % or less, based on the total chains.

The polyolefin of the invention is semi-crystalline polymer, and may include crystalline parts and amorphous parts. Specifically, a polymer chain comprising ethylene repeat units or alpha olefin repeat units is folded, and thus, the crystalline parts make a bundle, thereby forming a crystalline block (or segment) in the form of lamella.

It was confirmed that when a rate of chains having ASL of 22 nm or more is 16 wt % or more based on the total chains, and a rate of chains having ASL 8 nm or less is 38 wt % or more based on the total chains, by SSA (Successive Self-nucleation and Annealing) analysis, the polyolefin may have significantly improved drop impact strength, compared to the existing polyolefin having the same density.

SSA (Successive Self-nucleation and Annealing) is a method of quenching every time each stage ends while decreasing temperature by stages using Differential Scanning calorimeter (DSC), thereby preserving crystals crystallized at the corresponding temperature every stage.

Specifically, if polyolefin is heated and completely molten, and then, cooled to a specific temperature (T) and gradually annealed, lamellae unstable at the corresponding temperature (T) are still molten and only stable lamellae are crystallized. Wherein, the stability to the corresponding temperature (T) depends on the thickness of lamella, and the thickness of lamella depends on the structure of chain. Thus, by progressing heat treatment by stages, the thickness and distribution degree of lamellae according to the structure of polymer chain can be measured quantitatively.

Wherein, one melting peak does not appear only by lamellae having the same ethylene sequence length but appears by plural lamellae that have various sequence lengths but may be crystallized at the same temperature. Thus, the average length of ethylene sequences that are crystallized at a specific temperature may be referred to as ASL (Average Ethylene Sequence Length). Namely, throughout the specification, ASL of 22 nm or more means that the average length of ethylene sequences wherein melting peaks identically appear by SSA analysis, is 22 nm or more. And ASL of 8 nm or less means that the average length of ethylene sequences wherein melting peaks identically appear by SSA analysis, is 8 nm or less.

According to one embodiment of the invention, SSA may be conducted using DSC, by heating the polyolefin to the first heating temperature of 120 to 124° C., maintaining for 15 to 30 minutes, and then, cooling to 28 to 32° C., and while decreasing heating temperature by stages with (n+1)th heating temperature being 3 to 7° C. lower than nth heating temperature, repeating heating-annealing-quenching until the final heating temperature becomes 50 to 54° C.

More specifically, SSA may be conducted by the following steps i) to v):

i) heating polyolefin to 160° C. using DSC, and then, maintaining for 30 minutes to remove all the heat history before measurement;

ii) decreasing temperature from 160° C. to 122° C., and then, maintaining for 20 minutes, decreasing temperature to 30° C., and maintaining for 1 minute;

iii) heating to 117° C., which is 5° C. lower than 122° C., and then, maintaining for 20 minutes, decreasing temperature to 30° C., and maintaining for 1 minute;

iv) while gradually decreasing the heating temperature at the identical temperature rise speed, maintenance time and cooling temperature, with (n+1)th heating temperature being 5° C. lower than nth heating temperature, repeating until the heating temperature becomes 52° C.; and v) finally, increasing the temperature from 30° C. to 160° C.

The temperature profile of SSA analysis according to one embodiment of the invention is shown in FIG. 1.

Referring to FIG. 1, using differential scanning calorimeter (device name: DSC8000, manufacturing company: PerkinElmer), polyolefin is first heated to 160° C., and then, maintained for 30 minutes to remove all the heat history before measuring the sample. The temperature is decreased from 160° C. to 122° C., and then, maintained for 20 minutes, and decreased to 30° C. and maintained for 1 minute, and then, increased again.

Next, after heating to a temperature (117° C.) 5° C. lower than the first heating temperature of 122° C., the temperature is maintained for 20 minutes, decreased to 30° C. and maintained for 1 minute, and then, increased again. In this way, while gradually decreasing the heating temperature at the identical maintenance time and cooling temperature, with (n+1)th heating temperature being 5° C. lower than nth heating temperature, the process is repeated till 52° C. Wherein, the temperature increase speed and decrease speed are respectively controlled to 20° C./min. While raising the temperature from 30° C. to 160° C. at the temperature rise speed of 20° C./min, calory change is observed to measure thermogram.

As such, if heating-annealing-quenching of the polyolefin are repeated by SSA method, and then, the temperature is increased, peaks appear according to temperature, and the ASL can be calculated from the measured SSA thermogram.

More specifically, ASL can be calculated by the following Formula 1, wherein $CH_2$ mole fraction means the mole fraction of consecutive ethylene in the whole polyolefin, and the mole fraction of ethylene can be calculated by the following Formula 2:

$$ASL = 0.2534(C_2 \text{ mole fraction})/(1-CH_2 \text{ mole fraction}) \quad \text{[Formula 1]}$$

$$-\ln(CH_2 \text{ mole fraction}) = -0.331 + 135.5/T_m(K) \quad \text{[Formula 2]}$$

Tm is a melting temperature in polyolefin (unit: K), and it means herein peak temperatures of peaks according to temperature, obtained in SSA analysis.

For the explanations of the Formulas 1 and 2, and more specific calculation method of ASL, Journal of Polymer Science Part B: Polymer Physics. 2002, vol. 40, 813-821, and Journal of the Korean Chemical Society 2011, Vol. 55, No. 4 may be referred to.

Since the polyolefin of the invention has the above ASL rate, it can realize excellent mechanical properties of films, such as drop impact strength, and the like, compared to polyolefin having similar density and SCB content.

4) SBC (Short Chain Branch)

The polyolefin according to one embodiment of the invention may have SCB (Short Chain Branch) of 22 or more, or 23 or more, and 30 or less, or 28 or less, or 26 or less, or 25 or less per a carbon number of 1000.

SCB (Short Chain Branch) means a branch having a carbon number of 2 to 6 attached to the main chain of olefinic polymer, and commonly means a side branch made when alpha olefins having carbon numbers of 4 or more, such as 1-butene, 1-hexene, 1-octene, and the like, are used as comonomers. Such a SCB number (number/1000 C) can be measured using GPC-FTIR.

By GPC-FTIR, using PL-SP260VS, a sample was dissolved in 1,2,4-trichlorobenzene containing 0.0125% BHT at 160° C. for 10 hours for pretreatment, and then, measured at 160° C. using PerkinElmer Spectrum 100 FT-IR connected with high temperature GPC (PL-GPC220), Since the polyolefin of the invention has the above SBC number, it can realize excellent mechanical properties of films, such as drop impact strength, compared to polyolefins having similar densities.

5) Other Properties

The polyolefin according to one embodiment of the invention may be polydispersity index (PDI, Mw/Mn) of 3.3 to 4.0.

More specifically, the polydispersity index of the polyolefin of the invention may be 3.3 or more, or 3.4 or more, or 3.5 or more, or 3.6 or more, and 4.0 or less, or 3.9 or less, or 3.8 or less.

Since the polyolefin of the invention has relatively narrow molecular weight distribution as compared with low melt index, it can simultaneously meet excellent mechanical properties and tensile strength.

The polyolefin according to one embodiment of the invention may have weight average molecular weight (Mw) of 100,000 to 150,000 g/mol. More preferably, the weight average molecular weight may be 100,000 g/mol or more, or 110,000 g/mol or more, or 120,000 g/mol or more, and 150,000 g/mol or less, or 140,000 g/mol or less, or 130,000 g/mol or less.

In the present disclosure, number average molecular weight (Mn), weight average molecular weight (Mw), and polydispersity index are obtained by respectively measuring the weight average molecular weight (Mw) and number average molecular weight (Mn) of polyolefin using gel permeation chromatography (GPC), and calculating a rate (Mw/Mn) of weight average molecular weight to number average molecular weight as polydispersity index.

Specifically, a polyolefin sample was evaluated using Waters PL-GPC220 device using Polymer Laboratories PLgel MIX-B 300 mm length column. Evaluation temperature was 160° C., 1,2,4-trichlorobenzene was used as a solvent, and flow rate was 1 mL/min. A sample was prepared at the concentration of 10 mg/10 mL, and then, supplied in an amount of 200 µL. Using a calibration curve formed using polystyrene standards, Mw and Mn values were measured. The molecular weights of polystyrene standards were 2,000/10,000/30,000/70,000/200,000/700,000/2,000,000/4,000,000/10,000,000.

According to one example of the invention, the polyolefin may be a copolymer of, for example, ethylene and alpha olefin. Wherein, the alpha olefin may comprise one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbordene, phenyl norbordene, vinyl norbordene, dicyclopentadiene, 1,4-butadiene, 1,5-pentadiene, 1,6-hexadiene, styrene, alpha-methyl styrene, divinylbenzene, and 3-chloromethyl styrene. Preferably, the polyolefin may be a copolymer of ethylene and 1-butene, a copolymer of ethylene and 1-hexene, or a copolymer of ethylene and 1-octene.

And the polyolefin according to one embodiment of the invention may have dart drop impact strength measured according to ASTM D 1709 [Method A], after preparing a polyolefin film (BUR 2.3, film thickness 55 to 65 μm) using a film applicator, of 1,500 g or more, or 1,600 g or more, or 1,700 g or more. The higher dart drop impact strength is more excellent, and thus, the upper limit is not specifically limited, but for example, it may be 2,000 g or less, or 1,950 g or less, or 1,900 g or less.

As such, the polyolefin of the invention may exhibit further improved transparency and drop impact strength, compared to the existing polyolefins having densities of the same ranges.

Meanwhile, the polyolefin having the above properties according to one embodiment of the invention may be prepared by polymerizing olefin monomers in the presence of a hybrid supported metallocene compound as the active components of a catalyst More specifically, the polyolefin of the invention, although not limited hereto, may be prepared by polymerizing olefin monomers, in the presence of a hybrid supported metallocene catalyst comprising one or more first metallocene compounds selected from compounds represented by the following Chemical Formula 1; one or more second metallocene compounds selected from compounds represented by the following Chemical Formula 2; and a carrier supporting the first and second metallocene compounds:

[Chemical Formula 1]

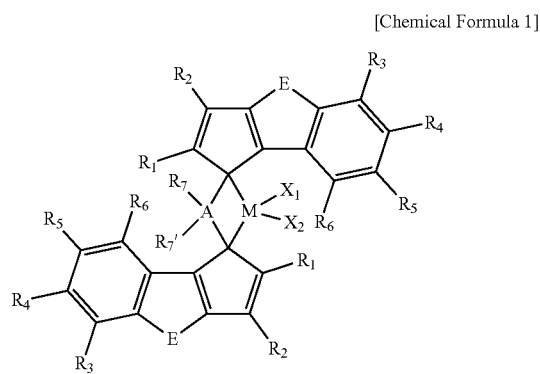

in the Chemical Formula 1,

M is a Group 4 transition metal, $X_1$ and $X_2$ are identical to or different from each other, and are each independently, hydrogen, halogen, $C_{1-20}$ alkyl, or QCOO—, and Q is $C_{1-20}$ alkyl, A is carbon, silicon or germanium, $R_1$ and $R_2$ are identical to or different from each other, and are each independently, $C_{1-20}$ alkyl, $C_{2-20}$ alkenyl, $C_{6-30}$ aryl, $R_3$ to $R_6$ are identical to or different from each other, and are each independently, hydrogen, $C_{1-20}$ alkyl, $C_{2-20}$ alkenyl, $C_{6-30}$ aryl, $C_{7-30}$ alkylaryl, or $C_{7-30}$ arylalkyl, $R_7$ and $R_7'$ are identical to or different from each other, and are each independently, $C_{1-20}$ alkyl, $C_{2-20}$ alkenyl, $C_{6-30}$ aryl, or $C_{2-20}$ alkoxy alkyl, and E is one selected from the group consisting of sulfur (S), oxygen (O) and selenium (Se),

[Chemical Formula 2]

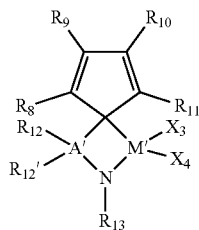

in the Chemical Formula 2,

M' is a Group 4 transition metal,

A' is carbon, silicon, or germanium, $X_3$ and $X_4$ are identical to or different from each other, and are each independently, halogen, or $C_{1-20}$ alkyl, $R_8$ to $R_{11}$ are identical to or different from each other, and are each independently, hydrogen, $C_{1-20}$ alkyl, $C_{2-20}$ alkenyl, $C_{6-20}$ aryl, $C_{7-20}$ alkylaryl, $C_{7-20}$ arylalkyl, or two or more neighboring substituents of $R_8$ to $R_{11}$ are linked to each other to form a substituted or unsubstituted aliphatic ring, aromatic ring, or hetero aromatic ring comprising one or more selected from the group consisting of N, O and S, $R_{12}$ and $R_{12}'$ are identical to or different from each other, and are each independently, $C_{1-20}$ alkyl, $C_{2-20}$ alkenyl, $C_{6-30}$ aryl, or $C_{2-20}$ alkoxy alkyl, and $R_{13}$ is $C_{1-20}$ alkyl, $C_{2-20}$ alkenyl, or $C_{6-30}$ aryl.

More specifically explaining, the substituents of the Chemical Formulas are as follows.

Halogen may be fluorine (F), chlorine (Cl), bromine (Br) or iodine (I).

$C_{1-20}$ alkyl may be linear, branched or cyclic alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be a methyl, ethyl, n-propyl, iso-propyl, b-butyl, iso-butyl, tert-butyl, n-pentyl, iso-pentyl, n-hexyl, or cyclohexyl group, and the like $C_{2-20}$ alkenyl may be linear, branched or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, the $C_{2-20}$ alkenyl may be ethenyl, propenyl, butenyl, pentenyl or cyclohexenyl, and the like.

$C_{6-30}$ aryl may mean a monocyclic, bicyclic or tricyclic aromatic hydrocarbon. Specifically, the $C_{6-30}$ aryl may be a phenyl, naphthyl or anthracenyl group, and the like.

$C_{7-20}$ alkylaryl may mean a substituent wherein one or more hydrogen atoms of aryl are substituted with alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl or cyclohexylphenyl, and the like.

$C_{7-20}$ arylalkyl may mean a substituent wherein one or more hydrogen atoms of alkyl are substituted with aryl. Specifically, the $C_{7-20}$ arylalkyl may be benzyl, phenylpropyl or phenylhexyl, and the like.

$C_{2-20}$ alkoxyalkyl is a structure comprising —Ra—O—Rb, and may be a substituent wherein one or more hydrogen atoms of alkyl(—Ra) are substituted with alkoxy(—O—Rb). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl or tert-butoxyyhexyl, and the like.

A hetero aromatic ring is heteroaryl comprising one or more selected from O, N and S as a heteroatom, and the carbon number is not specifically limited, but it may be C2 to 60 or C2 to 20. As examples of the hetero aromatic ring, thiophene, benzothiophene, dibenzothiophene, xanthene, thioxanthen, furan, pyrrole, imidazole, thiazole, oxazole, oxadiazole, triazole, pyridyl, bipyridyl, pyridinyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benxofuranyl, phenanthroline, isooxazolyl, thiadiazolyl, phenothiazinyl and dibenzofuranyl groups, and the like may be mentioned, but not limited thereto.

As Group 4 transition metal, titanium, zirconium, hafnium, and the like may be mentioned.

Halogen may be fluorine (F), chlorine (Cl), bromine (Br) or iodine (I).

The above explained substituents may be optionally substituted with one or more substituents selected from the group consisting of hydroxy, halogen, $C_{1-20}$ alkyl, $C_{2-20}$ alkenyl, $C_{6-30}$ aryl, and $C_{2-20}$ alkoxy alkyl, in the range where the effects identical or similar to the aimed effects are exhibited.

Using the hybrid supported catalyst, excellent drop impact strength may be secured by specific lamellar distribution of polyolefin, thereby preparing excellent polyolefin.

Specifically, in the hybrid supported catalyst according to one embodiment of the invention, the first metallocene compound has a small amount of short chain branches, and can easily prepare low molecular weight polyolefin. The second metallocene compound comprises a larger amount of short chain branches than the first metallocene compound, has a high dispersion degree of short chain branches, and can easily prepare polyolefin having relatively high molecular weight. Particularly, polymer prepared using a hybrid supported catalyst comprising the second metallocene and the first metallocene compound has a thick lamellar thickness and strong connection between lamellae, and thus, exhibits excellent mechanical properties.

Meanwhile, the metallocene compound represented by the Chemical Formula 1 forms a structure wherein two symmetrical ligand compounds are crosslinked by a bridge compound. The ligand compound comprises a Group 16 element having unshared electron pair. The unshared electron pair may provide electron-rich environment to the central metal atom of the metallocene compound, and simultaneously, act as Lewis base and exhibit excellent polymerization activity.

The ligand specifically consists of a structure wherein a 5-membered ring comprising a Group 16 heteroatom, and benzene and cyclopentadiene on both sides of the 5-membered ring are fused. Among them, the cyclopentadiene is linked to the central metal atom and bridge compound. Particularly, the substituents ($R_1$, $R_2$) of cyclopentadiene perform electron donating functions, and due to inductive effect, provide electron-rich environment. And, in case cyclopentadiene or benzene additionally has a substituent group, steric hindrance is formed to secure a vacant site of an appropriate range, thus facilitating monomer access, and increasing polymerization activity.

In addition to the structural characteristics of the ligand, the metallocene compound of the invention comprises a bridge group other than a transition metal compound. The bridge group may increase the size of the metallocene compound to increase accessibility of monomer reactant, and simultaneously, interact with a cocatalyst to improve support stability.

As explained above, the metallocene compound represented by the Chemical Formula 1, when used as a catalyst, exhibits low copolymerizability due to interaction between symmetrical ligands, bridge compound and transition metal, and thus, is suitable for preparation of low molecular weight polyethylene, and the polyethylene prepared therefrom has high MI and thus high processability.

As the central metal (M) of the metallocene compound represented by the Chemical Formula 1, Group 4 transition metals may be used, and preferably, titanium (Ti), zirconium (Zr) or hafnium (Hf) may be used.

Preferably, in the Chemical Formula 1, $X_1$ and $X_2$ are each independently, halogen, methyl, $CH_3COO-$, or $C(CH_3)_3COO-$.

Preferably, in the Chemical Formula 1, A may be silicon.

Preferably, in the Chemical Formula 1, E may be sulfur (S).

Preferably, in the Chemical Formula 1, $R_1$ and $R_2$ may be identical to or different from each other, and may be each independently, methyl or phenyl.

Preferably, in the Chemical Formula 1, $R_3$ to $R_6$ may be identical to or different from each other, and may be each independently, hydrogen, methyl, ethyl, propyl, or butyl.

Preferably, in the Chemical Formula 1, $R_7$, and $R_7'$ may be identical to or different from each other, and may be each independently, methyl, ethyl, phenyl, propyl, hexyl, or tert-butoxyhexyl.

As the first metallocene compounds capable of providing polyolefin exhibiting further increased drop impact strength, the metallocene compound of the Chemical Formula 1 may be one selected from the group consisting of the following compounds, but the invention is not limited thereto:

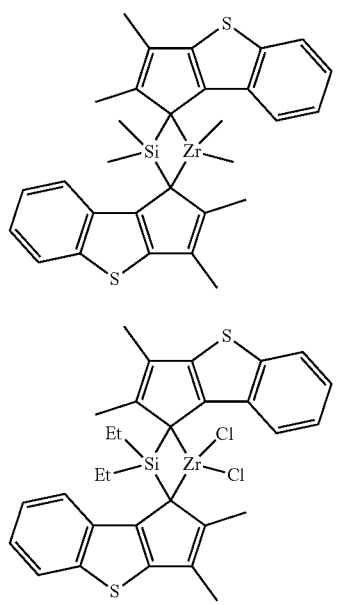

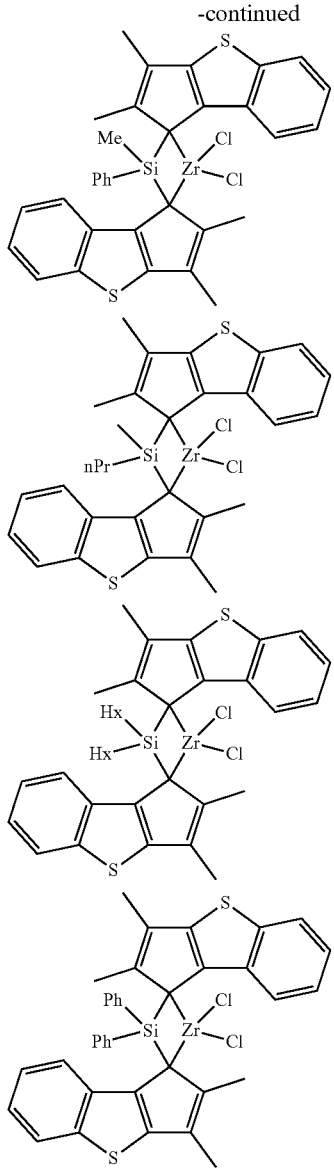
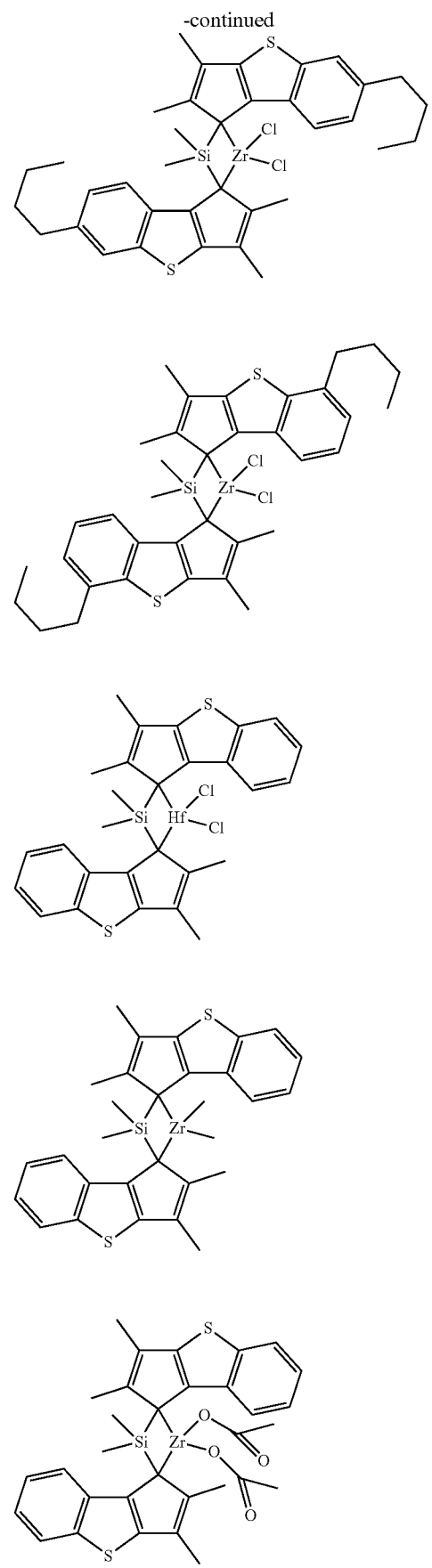

13

-continued

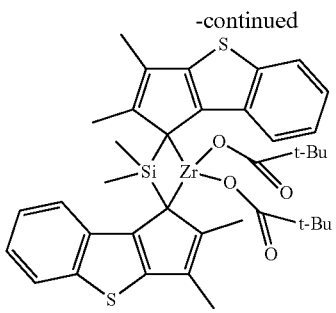

In the structural formulae,
Me denotes methyl,
Et denotes ethyl,
nPr denotes n-propyl,
Hx denotes n-hexyl,
Ph denotes phenyl,
t-Bu denotes tert-butyl.

The metallocene compound represented by the Chemical Formula 1 may be prepared by a preparation method, for example, as shown in the following Reaction Formula 1, but the preparation method is not limited thereto, and it may be prepared by any known preparation methods of organic compounds and metallocene compounds. The preparation method will be more specifically described in Preparation Examples later.

$A'R_{12}R_{12}'$. The second metallocene compound having such a specific structure may be applied for the polymerization of olefin polymer to exhibit high activity and copolymerizability, and provide high molecular weight olefin polymer.

Particularly, the second metallocene compound represented by the Chemical Formula 2 comprises well known CGC (constrained geometry catalyst) structure in the structure, and thus, introduction of comonomers is excellent, and besides, due to the electronic and steric properties of the ligand, distribution of comonomers is controlled. By these properties, ASL (average ethylene sequence length) may be controlled, and it is easy to prepare polyolefin exhibiting excellent drop impact strength.

As M' of the metallocene compound represented by the Chemical Formula 2, a Group 4 transition metal may be used, and preferably, titanium (Ti), zirconium (Zr) or hafnium (Hf) may be used.

Preferably, in the Chemical Formula 2, A' may be silicon.

Preferably, in the Chemical Formula 2, $X_3$ and $X_4$ may be each independently, methyl, or chlorine (Cl).

Preferably, in the Chemical Formula 2, $R_8$ to $R_{11}$ may be identical to or different from each other, and each independently, methyl or phenyl.

Preferably, in the Chemical Formula 2, two or more neighboring substituents of $R_8$ to $R_{11}$ may be linked to each other to form a substituted or unsubstituted aliphatic ring, aromatic ring, or hetero aromatic ring comprising one or more selected from the group consisting of N, O and S. For

[Reaction Formula 1]

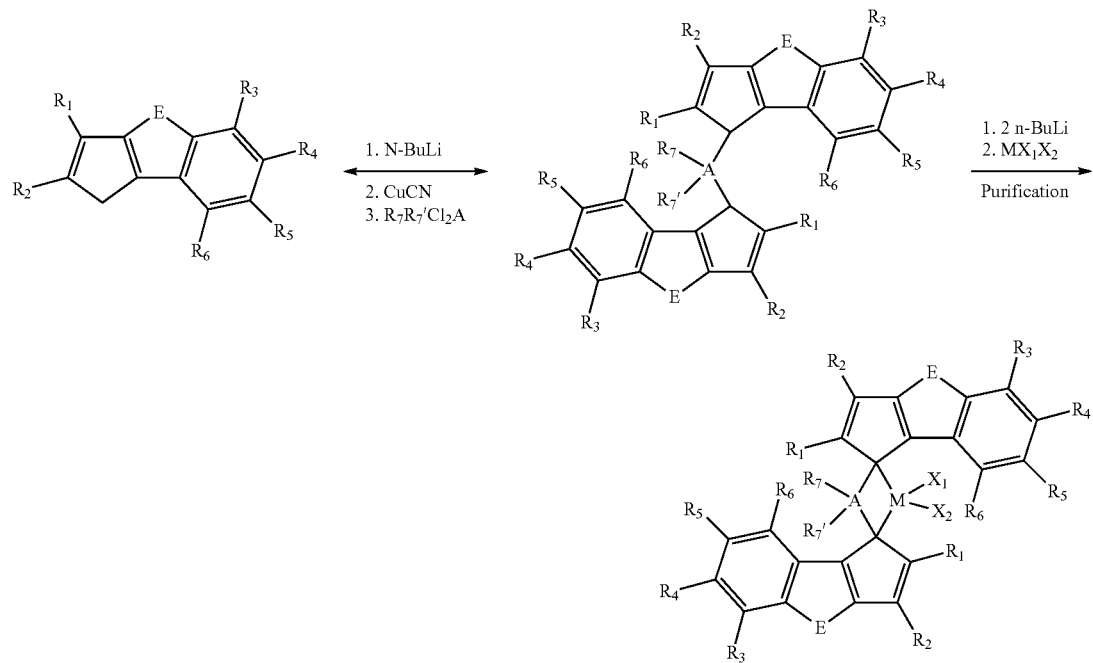

In the Reaction Formula 1, M, $X_1$, $X_2$, A, $R_1$ to $R_7'$, and E are as defined in the Chemical Formula 1.

According to one embodiment of the invention, the second metallocene compound represented by the Chemical Formula 2 comprises an aromatic ring compound comprising cyclopentadienyl or derivatives thereof and a nitrogen atom, and has a structure wherein the aromatic ring compound and nitrogen atom are crosslinked by a bridge group example, in the Chemical Formula 2, as two or more neighboring substituents of $R_8$ to $R_{11}$ are linked to each other to form an aliphatic ring, an aromatic ring or a hetero aromatic ring, cyclopentadiene-fused indenyl, fluorenyl, benzothiophene, or dibenzothiophene, and the like may be formed. And, the indenyl, fluorenyl, benzothiophene, or dibenzothiophene group may be substituted with one or more substituents.

Preferably, in the Chemical Formula 2, $R_{12}$, and $R_{12}'$ may be identical to or different from each other, and each independently, methyl, ethyl, phenyl, propyl, hexyl, or tert-butoxyhexyl.

Preferably, in the Chemical Formula 2, $R_{13}$ may be methyl, ethyl, n-propyl, iso-propyl, n-butyl, or ter-butyl.

As the second metallocene compounds capable of providing polyolefin exhibiting further increased drop impact strength, one or more selected from the group consisting of the following compounds may be mentioned, but the invention is not limited thereto:

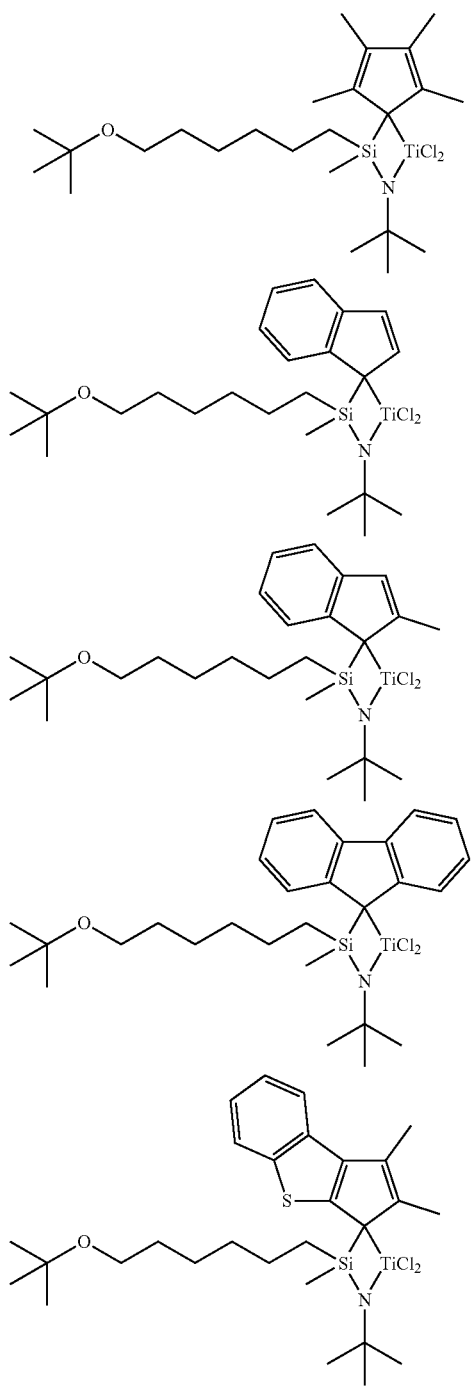

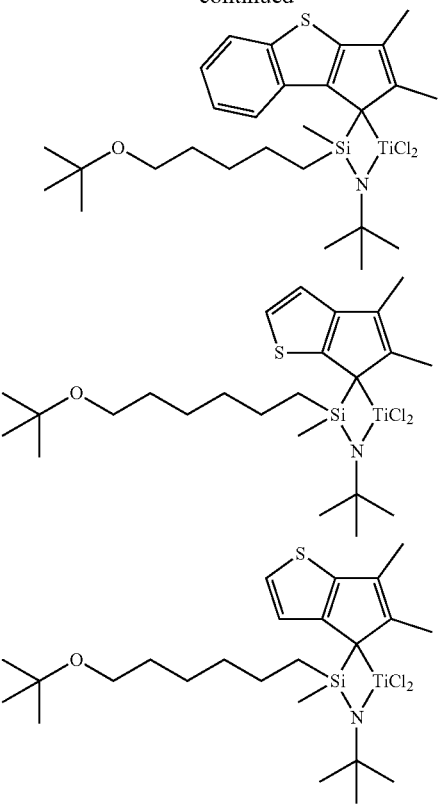

The second metallocene compound represented by the Chemical Formula 2 may be synthesized applying known reactions. Specifically, it may be prepared by connecting a nitrogen compound and cyclopentadiene derivative by a bridge compound to prepare a ligand compound, and then, introducing a metal precursor compound to conduct metalation, but the preparation method is not limited thereto, and for more detailed synthesis method, examples may be referred to.

As such, since the hybrid supported metallocene catalyst of one embodiment comprises the first and second metallocene compounds, it has excellent activity and can prepare polyolefin having excellent properties, particularly drop impact strength.

Particularly, the mole ratio of the first metallocene compound and second metallocene compound may be about 1:1 to about 1:10, preferably about 1:1 to about 1:5, more preferably about 1:1 to about 1:5 or about 1:1 to about 1:4. When the mole ratio of the first metallocene compound and second metallocene compound is within the above range, the molecular weight and SCB, ASL content and distribution of polyolefin prepared using the same may be controlled within a predetermined ranges, thereby meeting drop impact strength.

Meanwhile, since the first and second metallocene compounds have the above explained structural characteristics, they can be stably supported in a carrier.

As the carrier, carriers containing hydroxyl groups or siloxane groups on the surface may be used. Specifically, as the carrier, those dried at high temperature to remove moisture on the surface, thus containing highly reactive hydroxyl groups or siloxane groups may be used. More specifically, as the carrier, silica, alumina, magnesia or a mixture thereof may be used, and among them, silica may be more preferable. The carrier may be dried at high temperature, and for example, high temperature dried silica, silica-alumina, or silica-magnesia, and the like may be used, which may commonly comprise oxide, carbonate, sulfate, nitrate components such as $Na_2O$, $K_2CO_3$, $BaSO_4$ and $Mg(NO_3)_2$, and the like.

The drying temperature of the carrier may be preferably about 200 to 800° C., more preferably about 300 to 600° C., and most preferably about 300 to 400° C. If the drying temperature of the carrier is less than about 200° C., surface moisture may react with a cocatalyst, and if it is greater than about 800° C., pores on the surface of the carrier may be combined to decrease surface area, and surface hydroxyl groups may disappear and only siloxane groups may remain, and thus, reaction sites with a cocatalyst may decrease.

The amount of hydroxyl groups on the surface of the carrier may be preferably about 0.1 to 10 mmol/g, and more preferably, about 0.5 to 5 mmol/g. The amount of hydroxyl groups on the surface of the carrier may be controlled by the preparation method and conditions or drying conditions of the carrier, for example, temperature, time, vacuum or spray drying, and the like.

If the amount of hydroxy groups is less than about 0.1 mmol/g, reaction sites with a cocatalyst may be few, and if it is greater than about 10 mmol/g, they may be derived from moisture other than hydroxyl groups existing on the surface of the carrier particles, which is not preferable.

And, in the supported metallocene catalyst of one embodiment, a cocatalyst supported together in the carrier so as to activate the metallocene compound is not specifically limited as long as it is an organic metal compound including Group 13 metal and can be used for olefin polymerization in the presence of a common metallocene catalyst.

Specifically, the cocatalyst compound may comprise one or more of an aluminum-containing first cocatalyst of the following Chemical Formula 3, and a borate-based second cocatalyst of the following Chemical Formula 4

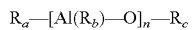    [Chemical Formula 3]

$R_a$—$[Al(R_b)$—$O]_n$—$R_c$

In the Chemical Formula 3, $R_a$, $R_b$, and $R_c$ are identical to or different from each other, and each independently, hydrogen, halogen, a C1 to C20 hydrocarbyl group, or a C1 to C20 hydrocarbyl group substituted with halogen;

n is an integer of 2 or more;

    [Chemical Formula 4]

$T^+[BG_4]^-$

In the Chemical Formula 4, $T^+$ is +1 valent polyatomic ion, B is boron in +3 oxidation state, G's are each independently, selected from the group consisting of a hydride group, a dialkylamido group, a halide group, an alkoxide group, an aryloxide group, a hydrocarbyl group, a halocarbyl group and a halo-substituted hydrocarbyl group, and G has 20 or less carbons, provided that G is a halide group at one or less position.

The first cocatalyst of the Chemical Formula 3 may be an alkylaluminoxane-based compound in which repeat units bond in linear, circular or network shape, and specific examples of the first cocatalyst may include methylaluminoxane (MAO), ethylalulminoxane, isobutylaluminoxane, or butylaluminoxane, and the like.

And, the second cocatalyst of the Chemical Formula 4 may be a borate-based compound in the form of tri-substituted ammonium salt, or dialkyl ammonium salt, or tri-substituted phosphonium salt. As specific examples of the second cocatalyst, borate-based compounds in the form of tri-substituted ammonium salt, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium tetrakis(pentafluorophenyl)borate, tripropylammonium tetrakis (pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-(2,4,6-trimethylanilinium)tetrakis-(2,3,4,6-tetrafluorophenyl)borate; borate-based compounds in the form of dialkylammonium salt, such as dioctadecylammonium tetrakis(pentafluorophenyl)borate, ditetradecylammonium tetrakis(pentafluorophenyl)borate and dicyclohexylammonium tetrakis(pentafluorophenyl)borate; and borate-based compounds in the form of trisubstituted phosphonium salt, such as triphenylphosphonium tetrakis(pentafluorophenyl)borate, methyloctadecylphosphonium tetrakis(pentafluorophenyl)borate and tri(2,6-dimethylphenyl) phosphonium tetrakis(pentafluorophenyl)borate, may be mentioned.

In the supported metallocene catalyst of one embodiment, the mass ratio of total transition metal included in the first metallocene compound and second metallocene compound to the carrier may be 1:10 to 1:1000. When the carrier and the metallocene compounds are included at the above mass ratio, optimum shape may be exhibited.

And, the mass ratio of the cocatalyst compound and the carrier may be 1:1 to 1:100. When the cocatalyst and the carrier are included at the above mass ratio, activity and polymer fine structure may be optimized.

The supported metallocene catalyst of one embodiment itself may be used for the polymerization of olefin monomers. And, the supported metallocene catalyst may be subjected to a contact reaction with olefin monomers and used as a pre-polymerized catalyst, and for example, the catalyst may be separately contacted with olefin monomers such as ethylene, propylene, 1-butene, 1-hexene, 1-octene, and the like and used as a pre-polymerized catalyst.

Meanwhile, the supported metallocene catalyst of one embodiment may be prepared by a method comprising steps of: supporting a cocatalyst in a carrier; and supporting the first and second metallocene compounds in the carrier where the cocatalyst is supported.

Wherein, the first and second metallocene compounds may be sequentially supported one by one, or they may be simultaneously supported. Although the support sequence is not limited, by first supporting the second metallocene catalyst having relatively poor morphology, the morphology of the hybrid supported metallocene catalyst may be improved, and after supporting the second metallocene catalyst, the first metallocene catalyst may be supported.

In the above method, supporting conditions are not specifically limited, and it may be conducted under conditions well known to a person having ordinary knowledge in the art. For example, high temperature supporting and low temperature supporting may be appropriately used, and for example, the supporting temperature may be about −30° C. to 150° C., preferably room temperature (about 25° C.) to about 100° C., more preferably room temperature to about 80° C. The supporting time may be appropriately controlled according to the amount of the metallocene compounds to be supported. The supported catalyst reacted may be used as it is, after filtering or decompression distilling a reaction solvent to remove, and if necessary, it may be soxhlet filtered with aromatic hydrocarbon such as toluene.

And, the supported catalyst may be prepared under solvent or non-solvent. As the solvent that can be used, aliphatic hydrocarbon solvents such as hexane or pentane, aromatic hydrocarbon solvents such as toluene or benzene, hydrocarbon solvents substituted with chlorine atom such as dichloromethane, ether-based solvents such as diethylether or THF, acetone, ethylacetate, and the like may be mentioned, and hexane, heptanes, toluene or dichloromethane may be preferably used.

Meanwhile, according to another embodiment of the invention, there is provided a method for preparing polyolefin comprising steps of polymerizing olefin monomers in the presence of the hybrid supported metallocene catalyst.

And, the olefin monomers may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosens, norbornene, norbornadiene, ethylidene norbordene, phenyl norbordene, vinyl norbordene, dicylcopentadiene, 1,4-butadiene, 1,5-pentadiene, 1,6-hexadiene, styrene, alpha-methylstyrene, divinylbenzene and 3-chloromethyl styrene.

For the polymerization reaction of olefin monomers, various polymerization processes known as the polymerization reaction of olefin monomers, such as continuous solution polymerization, bulk polymerization, suspension polymerization, slurry polymerization or emulsion polymerization, and the like, may be used. The polymerization reaction may be conducted at a temperature of about 25 to 500° C., or about 25 to 200° C., or about 50 to 150° C., under pressure of about 1 to 100 bar or about 10 to 80 bar.

And, in the polymerization reaction, the supported metallocene catalyst may be used while dissolved or diluted in a solvent such as pentane, hexane, heptanes, nonane, decane, toluene, benzene, dichloromethane, chlorobenzene, and the like. Wherein, the solvent may be treated with a small amount of alkylaluminum to remove a small amount of water or air that may have an adverse influence on the catalyst.

And, the polyolefin prepared by the method meets predetermined properties as explained above, thus exhibiting low density, excellent transparency and high drop impact strength.

And, in case the polyolefin is an ethylene-alpha olefin copolymer, preferably a copolymer of ethylene and 1-butene or a copolymer of ethylen-1-hexehe, the above properties may be more appropriately met.

Hereinafter, preferable examples are presented for better understanding of the invention. However, these examples are presented only as the illustrations of the invention and the scope of the invention is not limited thereby.

EXAMPLE

Synthesis Example 1: First Metallocene Compound

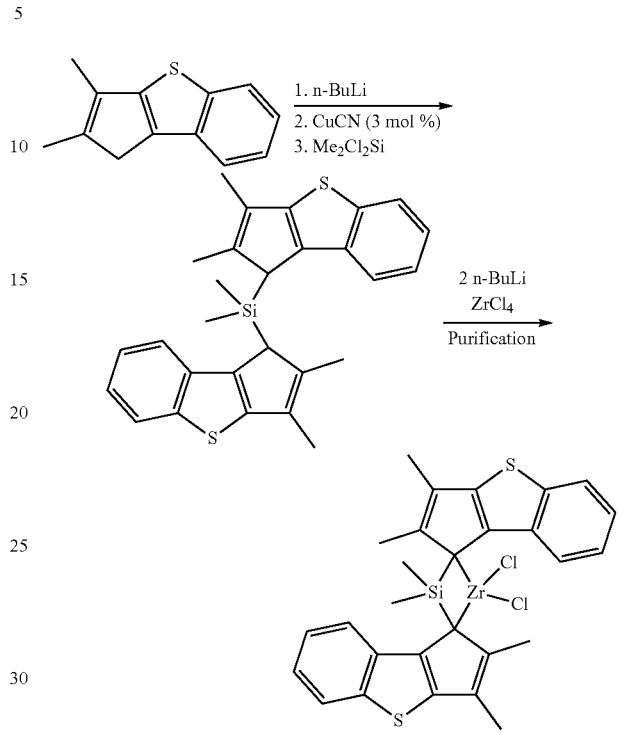

Preparation of Ligand Compound

Step 1

Preparation of bis(2,3-dimethyl-1H-benzo[b]cyclopenta[d]thiophen-1-yl)dimethylsilane 2,3-dimethyl-1H-benzo[b]cyclopenta[d]thiophene (1 equiv) was dissolved in toluene/THF (10/1, 0.5M), and n-BuLi (1.05 eq) was slowly added dropwise at −25° C., and then, the solution was stirred at room temperature for 3 hours. And then, CuCN (3 mol %) was added and stirred for 30 minutes, and then, dichloro dimethyl silane (0.5 eq) was added at −10° C., and stirred at room temperature overnight. After the reaction was completed, work-up was conducted with water, followed by drying to prepare a ligand.

Preparation of Metallocene Compound

Step 2: Preparation of dimethylsilane-diylbis(2,3-dimethyl-1H-benzo[b]cyclopenta[d]thiophen-1-yl) zirconium chloride The ligand prepared in the step 1 was dissolved in toluene/ether (2/1, 0.53M), and n-BuLi (2.05 eq) was added at −25° C., and then, the solution was stirred at room temperature for 5 hours. In the flask, a slurry of $ZrCl_4$ (1 eq) in toluene (0.17 M) was introduced, and stirred at room temperature overnight. After the reaction was completed, the solvent was vacuum dried, dichloromethane (DCM) was introduced again, LiCl was removed through a filter, and the filtrate was vacuum dried and recrystallized with hexane/

DCM, and then, the produced solid was filtered and vacuum dried to obtain a solid metallocene compound.

$^1$H-NMR (500 MHz, CDCl$_3$): 7.88 (d, 2H), 7.77 (d, 2H) 7.29-7.33 (m, 4H), 2.38 (s, 6H), 1.78 (s, 6H), 0.21 (s, 6H) ppm Synthesis Example 2: First Metallocene Compound

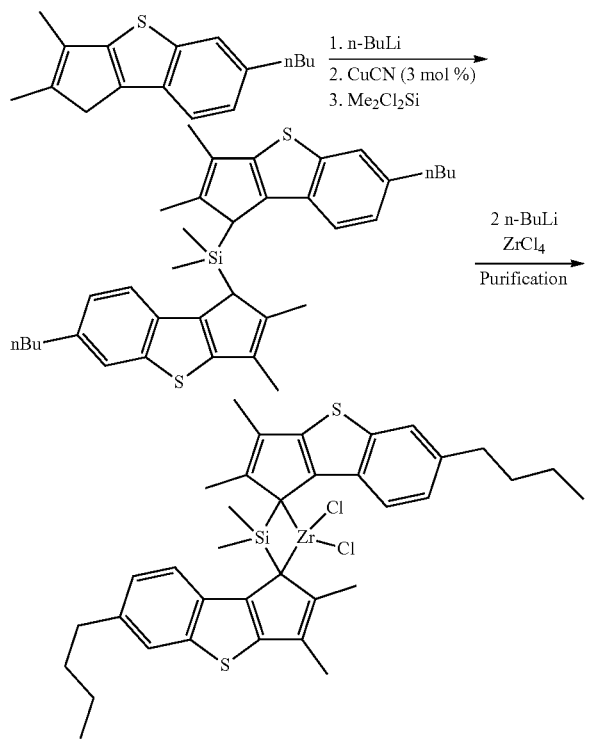

Preparation of Ligand Compound

Step 1: Preparation of bis(6-butyl-2,3-dimethyl-1H-benzo[b]cyclopenta[d]thiophen-1-yl)dimethylsilane 6-butyl-2,3-dimethyl-1H-benzo[b]cyclopenta[d]thiophene (1 equiv) was dissolved in toluene/THF (10/1, 0.5M), and n-BuLi (1.05 eq) was slowly added dropwise at −25° C., and then, the solution was stirred at room temperature for 3 hours. And then, CuCN (3 mol %) was added and stirred for 30 minutes, and then, dichloro dimethyl silane (0.5 eq) was added at −10° C., and stirred at room temperature overnight. After the reaction was completed, work-up was conducted with water, followed by drying to prepare a ligand.

Preparation of Metallocene Compound

Step 2: Preparation of dimethylsilane-diylbis(6-butyl-2,3-dimethyl-1H-benzo[b]cyclopenta[d]thiophen-1-yl)zirconium chloride The ligand prepared in the step 1 was dissolved in toluene/ether (2/1, 0.53M), and n-BuLi (2.05 eq) was added at −25° C., and then, the solution was stirred at room temperature for 5 hours. In the flask, a slurry of ZrCl$_4$ (1 eq) in toluene (0.17 M) was introduced, and stirred at room temperature overnight. After the reaction was completed, the solvent was vacuum dried, dichloromethane (DCM) was introduced again, LiCl was removed through a filter, and the filtrate was vacuum dried and recrystallized with hexane/DCM, and then, the produced solid was filtered and vacuum dried to obtain a solid metallocene compound.

1H-NMR (500 MHZ, CDCl$_3$): 7.79 (m, 4H), 7.46 (d, 2H), 2.64 (t, 4H), 2.18 (s, 6H), 1.79 (s, 6H), 1.56 (m, 4H), 1.40 (m, 4H), 1.32 (m, 4H), 0.89 (t, 6H), 0.21 (s, 6H) ppm Synthesis Example 3: Second Metallocene Compound Preparation of Ligand Compound 1.2 mol (150 g) of tetramethylcyclopentadiene and 2.4 L of THF were introduced

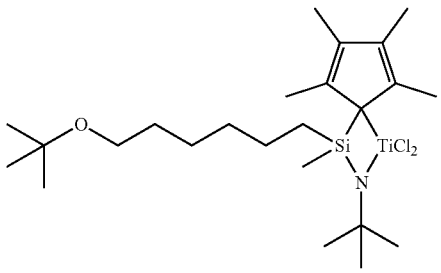

Preparation of Ligand Compound 1.2 mol (150 g) of tetramethylcyclopentadiene and 2.4 L of THF were introduced in a reactor, and the reactor was cooled to −20° C. 480 mL of n-BuLi was slowly added to the reactor. After n-BuLi was added, the solution was stirred for 12 hours while slowly raising the temperature of the reactor to a room temperature. After reaction for 12 an hours, equivalent of methyl (6-tert-butoxyhexyl)dichlorosilane (326 g) was rapidly introduced in the reactor. The solution was stirred for 12 hours while slowly raising the temperature of the reactor to a room temperature, and then, the reactor was cooled to 0° C. again, and then, 2 equivalents of t-BuNH$_2$ were added. The solution was stirred for 12 hours while slowly raising the temperature of the reactor to a room temperature. After reaction for 12 hours, THF was removed, 4 L of hexane was added, and salts were removed through labdori to obtain a filtered solution. The filtered solution was added again to the reactor, and then, hexane was removed at 70° C. to obtain a yellow solution.

Preparation of Metallocene Compound

Synthesis Example 4: Second Metallocene Compound

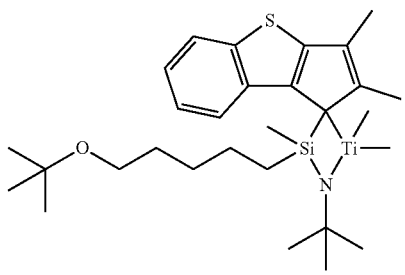

Preparation of Ligand Compound

To 11.1 mmol of 2,3-dimethyl-1H-benzo[b]cyclopenta[d]thiophene, 55 mL of THF was added to dissolve, and n-BuLi (1.05 eq, 4.7 mL) was slowly added dropwise at −78° C. After reaction at RT overnight, in another Schlenk flask, tether silane (1.05 eq, 3.2 g) was quantified, and then, 30 mL of THF was introduced and the temperature was decreased to 0° C. After transferring to the reaction solution, it was reacted at RT overnight. The solvent was dried, followed by filtering with hexane and concentration, and 30 mL of t-BuNH$_2$ was introduced and reacted at RT overnight. The solvent was dried, followed by filtering with hexane and concentration, thus obtaining 5 g of a product in the form of brown syrup with the yield of 100%.

Preparation of Metallocene Compound 5.4 mmol of the ligand compound obtained above was quantified in a Schlenk flask, and then, 30 mL of THF was introduct to dissolve. n-BuLi (2.05 eq, 4.4 mL) was added dropwise at −78° C., and then, reacted at RT overnight. MMB (2.5 eq, 4.5 mL) and TiCl$_4$ (1 eq, 5.4 mL) were added dropwise at −78° C. and reacted at RT overnight, and the reaction solution was vacuum dried and filtered with hexane, and then, DME (3 eq, 1.7 mL) was added dropwise. After reaction at RT overnight, the solvent was vacuum dried, followed by filtering with hexane and concentration, to obtain 2.2 g of a catalyst.

1H NMR (500 MHz, CDCl$_3$): 7.9 (d, 1H), 7.7 (d, 1H), 7.5 (dd, 1H), 7.4 (dd, 1H), 3.3 (t, 2H), 2.1 (s, 3H), 1.8 (s, 3H), 1.5-1.2 (m, 8H), 1.2 (s, 9H), 1.1 (s, 9H), 0.9 (s, 6H), 0.1 (s, 3H)

Comparative Synthesis Example 1

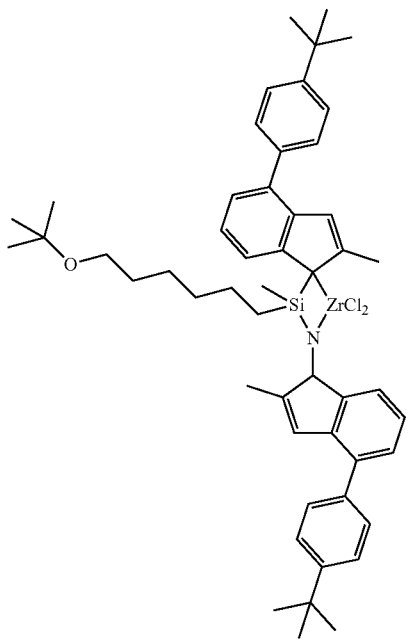

Preparation of Ligand Compound 2-methyl-4-tert-butylphenylindene (20.0 g, 76 mmol) was dissolved in toluene/THF=10/1 (230 mL), and n-BuLi (2.5 M in hexane, 22 g) was slowly added dropwise at 0° C., and then, the solution was stirred at room temperature for one day. And then, at −78° C., (6-tert-butoxyhexyl)dichloromethylsilane (1.27 g) was slowly added dropwise to the mixed solution, and stirred for about 10 minutes, and then, stirred at room temperature for one day. And, then, water was added to separate an organic layer, and then, the solvent was decompression distilled to obtain (6-t-butoxyhexyl)(methyl)-bis(2-methyl-4-tert-butyl-phenylindenyl)silane.

Preparation of Metallocene Compound

The ligand compound was dissolved in toluene/THF=5/1 (95 mL), n-BuLi (22 g) was slowly added dropwise at 18° C., and then, the solution was stirred at room temperature for one day. Bis(N,N'-diphenyl-1,3,-propanediamido)dichlorozirconium bis(tetrahydrofuran) was dissolved in toluene (229 mL), and slowly added dropwise to the reaction solution at −78° C., and stirred at room temperature for one day. And then, the reaction solution was filtered and vacuum dried, hexane was added, and the reaction solution was stirred to precipitate crystals. The precipitated crystals were filtered and decompression dried to obtain a metallocene compound.

1H NMR (300 MHz, CDCl$_3$): 1.20 (9H, s), 1.27 (3H, s), 1.34 (18H, s), 1.20-1.90 (10H, m), 2.25 (3H, s), 2.26 (3H, s), 3.38 (2H, t), 7.00 (2H, s), 7.09-7.13 (2H, m), 7.38 (2H, d), 7.45 (4H, d), 7.58 (4H, d), 7.59 (2H, d), 7.65 (2H, d)

Comparative Synthesis Example 2

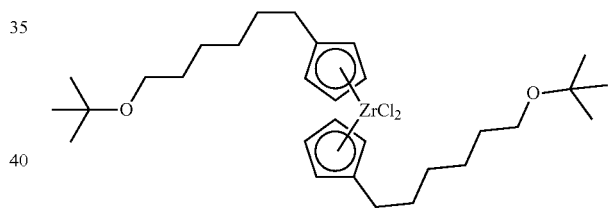

Preparation of Ligand Compound

Using 6-chlorohexanol, t-Butyl-O—(CH$_2$)$_6$—Cl was prepared by the method suggested in a document (Tetrahedron Lett. 2951 (1988)), and reacted with NaCp to obtain t-Butyl-O—(CH$_2$)$_6$—C$_5$H$_5$ (yield 60%, b.p. 80° C./0.1 mmHg)

Preparation of Metallocene Compound

At −78° C., t-Butyl-O—(CH$_2$)$_6$—C$_5$H$_5$ was dissolved in THF, and n-BuLi was slowly added, and then, the temperature was raised to room temperature, and they were reacted for 8 hours. At −78° C., to a suspension of ZrCl$_4$(THF)$_2$ (1.70 g, 4.50 mmol)/THF(30㎖), the above synthesized lithium salt solution was slowly added, and further reacted at room temperature for 6 hours.

All the volatiles were vacuum dried, and to the obtained oily liquid material, a hexane solvent was added to filter. The filtered solution was vacuum dried, and then, hexane was added to induce precipitate at low temperature (−20° C.). The obtained precipitate was filtered at low temperature to obtain a [tBu-O—(CH$_2$)$_6$—C$_5$H$_4$]$_2$ZrCl$_2$ compound in the form of white solid (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

Comparative Synthesis Example 3

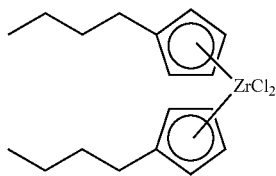

Preparation of Ligan Compound

In a dried 250 mL Schlenk flask, 3.7 g (40 mmol) of 1-chlorobutane was put and dissolved in 40 mL of THF. 20 mL of sodium cyclopentadienylide/THF solution was slowly added thereto, and then, stirred for one day. To the reaction mixture, 50 mL of water was added to quench, and it was extracted with ether (50 mL×3), and then, organic layers combined were sufficiently washed with brine. After drying the remaining moisture with MgSO$_4$ and filtering, the solvent was removed under vacuum decompression, thus obtaining a dark brown viscose product of 2-butyl-cyclopenta-1,3-diene.

Preparation of Metallocene Compound

In a dried 250 mL Schlenk flask, about 4.3 g (23 mmol) of the above synthesized ligand compound was put and dissolved in about 60 mL of THF. About 11 mL of n-BuLi solution (2.0M, in hexane, 28 mmol) was added thereto, and stirred for one day, and then, the solution was slowly added to a flask containing 3.83 g (10.3 mmol) of ZrCl$_4$(THF)$_2$ dispersed in about 50 mL of ether, at −78° C.

When the temperature of the reaction mixture was raised to room temperature, the light brown suspension turned into a turbid yellow suspension. After stirring for one day, all the solvents of the reaction mixture were dried, about 200 mL of hexane was put, and the solution was sonicated and sedimented, and then, the hexane solution floating in the upper layer was decanted with a cannula. This process was repeated twice to obtain a hexane solution, which was dried under vacuum depression, and it was confirmed that a compound in the form of yellow solid, bis(3-butyl-2,4-dienyl) zirconium (IV) chloride, was produced.

$^1$H NMR (500 MHz, CDCl$_3$): 0.91 (6H, m), 1.33 (4H, m), 1.53 (4H, m), 2.63 (4H, t), 6.01 (1H, s), 6.02 (1H, s), 6.10 (2H, s), 6.28 (2H, s)

Comparative Synthesis Example 4

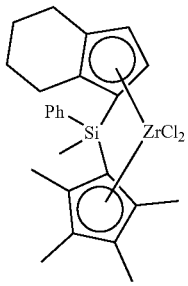

Preparation of Ligand Compound

Tetramethylcyclopentadiene (TMCP) was lithiated with n-BuLi (1 equivalent) in THF (0.4 M) and filtered, and thus, tetramethylcyclopentyl-Li salts (TMCP-Li salts) were used. Indene was lithiated with n-BuLi (1 equivalent) in hexane (0.5 M) and filtered, and thus, indene-Li salts (Ind-Li salts) were used. Into a 250 mL Schlenk flask, under Ar, 50 mmol of tetramethylcyclopentyl-Li salts (TMCP-Li salts) and 100 mL of tetrahydrofuran (THF) were introduced. At −20° C., 1 equivalent of dichloromethylphenyl silane was added. After about 6 hours, 3 mol % of CuCN and Ind-Li salts (50 mmol, MTBE 1M solution) were added at −20° C., and reacted for about 12 hours. Organic layers were separated with water and hexane to obtain a ligand.

Preparation of Metallocene Compound

Into a dried 250 mL Schlenk flask, 50 mmol of the above synthesized ligand compound was introduced and dissolved in about 100 mL of MTBE under Ar, and 2 equivalents of n-BuLi were added dropwise at −20° C. After reaction for about 16 hours, the ligand-Li solution was added to ZrCl$_4$(THF)$_2$ (50 mmol, MTBE 1 M solution). After reaction for about 16 hours, solvents were removed, and the reaction mixture was dissolved in methylenechloride (MC) and filtered to remove LiCl. The solvent of the filtrate was removed, about 50 mL of MTBE and about 100 mL of hexane were added, and the solution was stirred for about 2 hours, and then, filtered to obtain a solid metallocene catalyst precursor.

In a high pressure stainless steel (sus) reactor, the metallocene catalyst precursor (20 mmol) obtained above, 60 mL of DCM, and 5 mol % of Pd/C catalyst were introduced under argon atmosphere. The argon inside the high pressure reactor was replaced with hydrogen three times, and hydrogen was filled such that the pressure became about 20 bar. By stirring at about 35° C. for about 24 hours, the reaction was completed. The inside of the reactor was replaced with argon, and then, the DCM solution was transferred to the schlenk flask under argon atmosphere. The solution was passed through celite under argon to remove the Pd/C catalyst, and the solvent was dried to secure metallocene compounds of different stereoisomers (A, B forms) at a rate of 1.3:1.

$^1$H NMR (500 MHz, CDCl$_3$):

Form A: 0.88 (3H, s), 1.43-1.50 (1H, m), 1.52-1.57 (1H, m), 1.60 (3H, s), 1.62-1.68 (1H, m), 1.87-1.95 (1H, m), 1.95-2.00 (1H, m), 2.00 (3H, s), 2.06 (3H, s), 2.08 (3H, s), 2.41-2.47 (1H, m), 2.72-2.78 (1H, m), 3.04-3.10 (1H, m), 5.62 (1H, d), 6.73 (1H, d), 7.49 (3H, m), 7.87 (2H, m)

Form B: 0.99 (3H, s), 1.42 (3H, s), 1.60-1.67 (2H, m), 1.90-1.98 (1H, m), 1.95 (3H, s), 2.06 (3H, s), 2.06-2.10 (1H, m), 2.11 (3H, s), 2.44-2.49 (1H, m), 2.66-2.70 (1H, m), 2.74-2.79 (1H, m), 3.02-3.11 (1H, m), 5.53 (1H, d), 6.74 (1H, d), 7.48 (3H, m), 7.88 (2H, m).

Comparative Synthesis Example 5

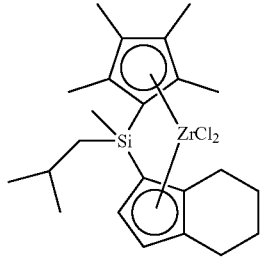

Preparation of Ligand Compound

Tetramethylcyclopentadiene (TMCP) was lithiated with n-BuLi (1 equivalent) in THF (0.4 M) and filtered, and thus, tetramethylcyclopentyl-Li salts (TMCP-Li salts) were used. Indene was lithiated with n-BuLi (1 equivalent) in hexane (0.5 M) and filtered, and thus, indene-Li salts (Ind-Li salts) were used. Into a 250 mL Schlenk flask, under Ar, 50 mmol of tetramethylcyclopentyl-Li salts (TMCP-Li salts) and about 100 mL of tetrahydrofuran (THF) were introduced. At −20° C., 1 equivalent of dichloromethyl-(iso-propyl) silane was added. After about 6 hours, 3 mol % of CuCN and Ind-Li salts (50 mmol, MTBE 1M solution) were added at −20° C., and reacted for about 12 hours. Organic layers were separated with water and hexane to obtain a ligand.

Preparation of Metallocene Compound

Into a dried 250 mL Schlenk flask, 50 mmol of the ligand compound synthesized in 1-1 was introduced and dissolved in 100 mL of MTBE under Ar, and 2 equivalents of n-BuLi were added dropwise at −20° C. After reaction for about 16 hours, the ligand-Li solution was added to $ZrCl_4(THF)_2$ (50 mmol, MTBE 1 M solution). After reaction for about 16 hours, solvents were removed, and the reaction mixture was dissolved in methylenechloride (MC) and filtered to remove LiCl. The solvent of the filtrate was removed, and about 50 mL of MTBE and about 100 mL of hexane were added, and the solution was stirred for about 2 hours, and then, filtered to obtain a solid metallocene catalyst precursor.

In a high pressure stainless steel (sus) reactor, the metallocene catalyst precursor (20 mmol) obtained above, 60 mL of DCM, and 5 mol % of Pd/C catalyst were introduced under argon atmosphere. The argon inside the high pressure reactor was replaced with hydrogen three times, and hydrogen was filled such that the pressure became about 20 bar. By stirring at about 35° C. for 24 hours, the reaction was completed. The inside of the reactor was replaced with argon, and then, the DCM solution was transferred to the schlenk flask under argon atmosphere. The solution was passed through celite under argon to remove the Pd/C catalyst, and the solvent was dried to obtain a solid catalyst precursor.

$^1$H NMR (500 MHz, C6D6): 0.62 (3H, s), 0.98 (3H, d), 1.02 (3H, d), 1.16 (2H, dd), 1.32-1.39 (3H, m), 1.78 (3H, s), 1.81 (3H, s), 1.84-1.94 (3H, m), 2.01 (3H, s), 2.03 (1H, m), 2.04 (3H, s), 2.35 (2H, m), 2.49-2.55 (1H, m), 3.13-3.19 (1H, m), 5.27 (1H, d), 6.75 (1H, d).

Comparative Synthesis Example 6

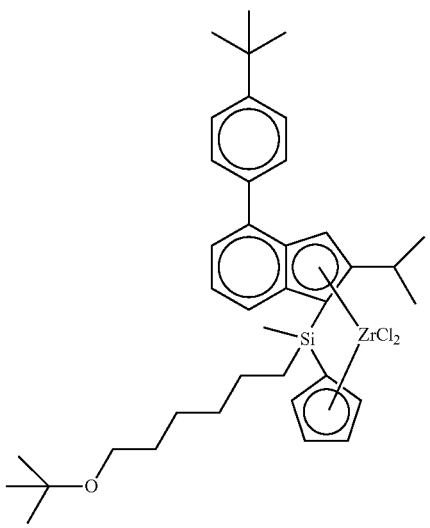

Preparation of Ligand Compound

In a dried 250 mL schlenk flask, 11.618 g (40 mmol) of 4-(4-(tert-butyl)phenyl)-2-isopropyl-1H-indene was introduced, and 100 mL of THF was introduced under argon. A diethylether solution was cooled to 0° C., and then, 18.4 mL (46 mmol) of nBuLi solution (2.5 M, in hexane) was slowly added dropwise. The temperature of the reaction mixture was slowly raised to room temperature, and then, stirred until the next day. Into another 250 mL schlenk flask, a solution of 12.0586 g of dichloromethyltethersilane (40 mmol, purity 90%) and 100 mL of hexane was prepared, and the flask was cooled to −30° C., and then, the lithiated solution was added dropwise thereto. After the addition, the temperature of the mixture was slowly raised to room temperature, and then, the mixture was stirred for one day. Next day, 33.6 mL of NaCp in THF (2M) was added dropwise and the mixture was stirred for one day, and then, 50 mL of water was poured into the flask to quench, and organic layers were separated and dried with $MgSO_4$. As the result, 23.511 g (52.9 mmol) of oil was obtained (NMR based purity/wt %=92.97%. Mw=412.69).

Preparation of Metallocene Compound

Into an oven-dried 250 mL schlenk flask, the ligand was introduced and dissolved in 80 mL of toluene and 19 mL of MTBE (160 mmol, 4 equiv.), and then, 2.1 equivalents of n-BuLi solution (84 mmol, 33.6 mL) was added to lithiate until the next day. In a glove box, 1 equivalent of $ZrCl_4(THF)_2$ was put in a 250 mL schlenk flask, and ether was added to prepare a suspension. Both flasks were cooled to −20° C., and then, the ligand anions were slowly added to the Zr suspension. After the addition, the temperature of the reaction mixture was slowly raised to room temperature.

After stirring for one day, MTBE in the mixture was immediately filtered with Schlenk filter under argon to remove produced LiCl. After the removal, the remaining filtrate was removed through vacuum decompression, and a small amount of pentane was added. Wherein, the addition of pentane promotes crystallization because the synthesized catalyst precursor has low solubility to pentane. The slurry was filtered under argon, and the filter cake remaining on the top and the filtrate were respectively confirmed through NMR whether or not a catalyst was synthesized, and weighed in a glove box and sampled to confirm the yield and purity (Mw=715.04).

$^1$H NMR (500 MHz, CDCl$_3$): 0.60 (3H, s), 1.01 (2H, m), 1.16 (6H, s), 1.22 (9H, s), 1.35 (4H, m), 1.58 (4H, m), 2.11 (1H, s), 3.29 (2H, m), 5.56 (1H, s), 5.56 (2H, m), 5.66 (2H, m), 7.01 (2H, m), 7.40 (3H, m), 7.98 (2H, m)

Preparation Example of Hybrid Supported Metallocene Catalyst

Preparation Example 1

Into 20 L SUS high pressure reactor, 2.0 kg of toluene and 1000 g of silica (Grace Davison, SP2410) were introduced, and stirred while raising the temperature of the reactor to 40° C. In the reactor, 5.4 kg of methylaluminoxane (10 wt % in toluene, manufactured by Albemarle Corp.) were introduced, and the temperature was raised to 70° C., and then, the solution was stirred for about 12 hours at about 200 rpm. And then, the temperature of the reactor was decreased to 40° C., and the stirring was stopped. And, the reaction product was allowed to stand for about 10 minutes, and then, decanted. 2.0 kg of toluene was added again to the reaction product, the solution was stirred for about 10 minutes and the stirring was stopped, and the reaction product was allowed to stand for about 30 minutes, and then, decanted.

In the reactor, 2.0 kg of toluene was introduced, and subsequently, the compound (17.5 mmol) prepared in the Synthesis Example 1, the compound (52.5 mmol) prepared in the Synthesis Example 3 and 1000 mL of toluene were introduced. The temperature of the reactor was raised to 85° C., and the solution was stirred for about 90 minutes.

And then, the temperature of the reactor was decreased to room temperature, the stirring was stopped, and the reaction product was allowed to stand for about 30 minutes, and then, decanted. Subsequently, in the reactor, 3 kg of hexane was introduced, and the hexane slurry solution was transferred to a 20 L filter dryer and filtered, and decompression dried at 50° C. for about 4 hours to obtain 1.5 kg of a supported catalyst.

Preparation Example 2

A hybrid supported metallocene catalyst was prepared by the same method as Preparation Example 1, except that the metallocene compounds of Synthesis Example 2 (17.5 mmol) and Synthesis Example 3 (52.5 mmol) were used.

Preparation Example 3

A hybrid supported metallocene catalyst was prepared by the same method as Preparation Example 1, except that the metallocene compounds of Synthesis Example 1 (17.5 mmol) and Synthesis Example 4 (52.5 mmol) were used.

Comparative Preparation Example 1

A hybrid supported metallocene catalyst was prepared by the same method as Preparation Example 1, except that the metallocene compounds of Comparative Synthesis Example 2 (23.3 mmol) and Synthesis Example 3 (46.7 mmol) were used.

Comparative Preparation Example 2

A hybrid supported metallocene catalyst was prepared by the same method as Preparation Example 1, except that the metallocene compounds of Comparative Synthesis Example 3 (23.3 mmol) and Synthesis Example 3 (46.7 mmol) were used.

Comparative Preparation Example 3 hybrid supported metallocene catalyst was prepared by the same method as Preparation Example 1, except that the metallocene compounds of Comparative Synthesis Example 1 (42.0 mmol) and Comparative Synthesis Example 4 (28.0 mmol) were used.

Comparative Preparation Example 4 hybrid supported metallocene catalyst was prepared by the same method as Preparation Example 1, except that the metallocene compounds of Comparative Synthesis Example 5 (60 mmol) and Comparative Synthesis Example 6 (10 mmol) were used.

Preparation Example of Polyolefin

Ethylene-1-hexene Copolymer

As a polymerization reactor, a 140 L continuous polymerization reactor operated at the reaction flow rate of about 7 m/s, in which an isobutene slurry loop process can be progressed, was prepared. And, in the reactor, reactants required for olefin polymerization as described in Table 1 were continuously introduced.

As the supported catalyst for olefin polymerization, those prepared in Preparation Examples described in Table 1 were used, and the supported catalyst was mixed with isobutene slurry and introduced.

The olefin polymerization reaction was conducted at a temperature of about 85° C. and a pressure of about 40 bar.

The main conditions of the polymerization reaction were described in Table 1.

TABLE 1

| Catalyst | Example 1 Preparation Example 1 (Synthesis Example 1/ Synthesis Example 3) | Example 2 Preparation Example 2 (Synthesis Example 2/ Synthesis Example 3) | Example 3 Preparation Example 3 (Synthesis Example 1/ Synthesis Example 4) | Comparative Example 1 Comparative Preparation Example 1 (Comparative Synthesis Example 2/ Synthesis Example 3) | Comparative Example 2 Comparative Preparation Example 2 (Comparative Synthesis Example 3/ Synthesis Example 3) | Comparative Example 3 Comparative Preparation Example 3 (Comparative Synthesis Example 1/ Comparative Synthesis Example 4) | Comparative Example 4 Comparative Preparation Example 4 (Comparative Synthesis Example 5/ Comparative Synthesis Example 6) | Comparative Example 5 Comparative Preparation Example 3 (Comparative Synthesis Example 1/ Comparative Synthesis Example 4) |
|---|---|---|---|---|---|---|---|---|
| Ethylene introduction amount (kg/hr) | 25 | 25 | 25 | 25 | 25 | 25 | 25 | 24 |
| Hydrogen introduction amount (ppm) | 32 | 35 | 90 | 27 | 20 | 5 | 8 | 5 |
| 1-Hexene introduction amount (wt %) | 13 | 13 | 14 | 12 | 12.5 | 13 | 12.5 | 13.0 |
| Slurry Density (g/L) | 556 | 557 | 560 | 560 | 554 | 555 | 558 | 555 |
| Activity (kgPE/kgSiO$_2$ · hr) | 5.7 | 6.0 | 7.8 | 4.3 | 3.2 | 5.1 | 3.0 | 4.4 |
| Bulk density (g/mL) | 0.38 | 0.37 | 0.36 | 0.43 | 0.41 | 0.33 | 0.38 | 0.33 |
| Settling efficiency (%) | 40 | 40 | 42 | 40 | 43 | 45 | 40 | 48 |

Experimental Example

For the polyolefins prepared in Examples and Comparative Examples, the properties were measured as follows, and the results were shown in the following Table 2.
  (1) Density: measured according to ASTM D1505 standard.
  (2) Melt Index (MI): measured according to ASTM D1238 (condition E, 190° C., 2.16 kg load) standard.
  (3) Molecular weight (Mn, Mw, g/mol) and polydispersity index (PDI, Mw/Mn)

Using gel permeation chromatography (GPC, manufactured by Agilent company), the weight average molecular weight (Mw) and number average molecular weight (Mn) of polyolefin were measured, and the weight average molecular weight was divided by number average molecular weight to calculate polydispersity index (PDI).

Specifically, as gel permeation chromatography (GPC) device, Agilent PL-GPC220 device was used, and Polymer Laboratories PLgel MIX-B 300 mm length column was used. Wherein, the measurement temperature was 160° C., 1,2,4-trichlorobenzene was used as a solvent, and the flow rate was 1 mL/min. Using GPC analyzer (PL-GP220), each polyolefin sample obtained in Examples and Comparative Examples was dissolved in 1,2,4-trichlorobenzene containing 0.0125% BHT at 160° C. for 10 hours for pretreatment, and prepared at the concentration of 10 mg/10 mL, and then, supplied in the amount of 200 μL. Using a calibration curve formed using polystyrene standard specimens, Mw and Mn values were derived. As the polystyrene standard specimens, 9 kinds having weight average molecular weights of 2000 g/mol, 10000 g/mol, 30000 g/mol, 70000 g/mol, 200000 g/mol, 700000 g/mol, 2000000 g/mol, 4000000 g/mol, 10000000 g/mol were used.

(4) SCB (Short Chain Branch) content (content of C 2 to 6 branches per 1,000 carbons, unit: number/1,000 C)

Using PL-SP260VS, the sample was dissolved in 1,2,4-trichlorobenzene containing 0.0125% BHT at 160° C. for 10 hours for pretreatment, and then, SCB content was measured at 160° C. using PerkinElmer Spectrum 100 FT-IR connected to high temperature GPC (PL-GPC220).
  (5) ASL (Average Ethylene Sequence Length)

Using differential scanning calorimeter (device name: DSC8000, manufacturing company: PerkinElmer), polyolefin was initially heated to 160° C., and then, maintained for 30 minutes to remove heat history before measurement of the sample.

The temperature was decreased from 160° C. to 122° C. and maintained for 20 minutes, decreased to 30° C. and maintained for 1 minute, and then, increased again. Next, after heating to a temperature (117° C.) 5° C. lower than the initial heating temperature of 122° C., the temperature was maintained for 20 minutes, decreased to 30° C. and maintained for 1 minute, and then, increased again. In this way, while gradually decreasing the heating temperature with (n+1)th heating temperature being 5° C. lower than nth heating temperature, with the same maintenance time and cooling temperature, the above process was repeated until the final heating temperature became 52° C. Wherein, the temperature increase and decrease speeds were respectively controlled to 20° C./min. Finally, while increasing the temperature from 30° C. to 160° C. at a temperature rise speed of 20° C./min, calory change was observed to measure SSA thermogram.

(6) Dart drop impact strength:

Polyolefin resin was subjected to inflation molding using a single screw extruder (Yoojin-Eng. Blown Film M/C, 50 pie) at the extrusion temperature of 130~170° C. to a thickness of 60 μm. Wherein, a die gap was 2.0 mm, and a blown-up ratio was 2.3.

For the prepared film, dart drop impact strength was measured 20 times or more per one film sample according to ASTM D1709 [Method A] standard, and the average value was taken.

TABLE 2

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Density (g/cm$^3$) | 0.918 | 0.917 | 0.917 | 0.919 | 0.917 | 0.920 | 0.918 | 0.920 |
| MI$_{2.16}$ (g/10 min) | 1.06 | 1.02 | 1.09 | 0.60 | 1.14 | 0.6 | 0.96 | 0.3 |
| Mw (g/mol) | 124,000 | 124,000 | 123,000 | 126,000 | 123,000 | 138,000 | 122,000 | 136,000 |
| PDI | 3.72 | 3.54 | 3.71 | 2.79 | 2.72 | 2.85 | 2.88 | 2.88 |
| ASL ≥22 nm (wt %) | 18 | 16 | 16 | 5 | 2 | 37 | 13 | 38 |
| ASL ≤8 nm (wt %) | 41 | 40 | 42 | 34 | 36 | 22 | 18 | 21 |
| SCB | 22.4 | 22.9 | 23.6 | 21.9 | 21.1 | 22.8 | 22.5 | 22.0 |
| Dart drop impact strength (g) | 1,790 | 1,650 | 1,870 | 1,300 | 1,230 | 440 | 1,390 | 380 |

Referring to Table 2, the polyolefins of Examples 1 to 3 of the invention exhibited very excellent dart drop impact strength of 1,650 g or more, compared to Comparative Examples 1 to 5 having similar densities.

What is claimed is:

1. Polyolefin satisfying requirements of 1) to 3):
   1) density measured according to ASTM D1505 being 0.915 g/cm$^3$ to 0.930 g/cm$^3$;
   2) melt index (MI) measured at 190° C., under load of 2.16 kg according to ASTM D1238 being 0.5 to 1.5 g/10 min; and
   3) by Successive Self-nucleation and Annealing (SSA) analysis, a rate of chains having ASL (Average Ethylene Sequence Length) of 22 nm or more being 16 wt % or more based on a total chains, and a rate of chains having Average Ethylene Sequence Length (ASL) of 8 nm or less being 38 wt % or more based on the total chains.

2. The polyolefin according to claim 1, wherein the SSA is conducted using differential scanning calorimeter, by heating the polyolefin to the first heating temperature of 120 to 124° C., maintaining for 15 to 30 minutes, and then, cooling to 28 to 32° C., and while decreasing heating temperature by stages with $(n+1)^{th}$ heating temperature being 3 to 7° C. lower than nth heating temperature, repeating heating-annealing-quenching until the final heating temperature becomes 50 to 54° C., and finally, raising the temperature from 30° C. to 160° C.

3. The polyolefin according to claim 1, wherein Short Chain Branch (SCB) content is 22/1000 C or more.

4. The polyolefin according to claim 1, wherein polydispersity index (PDI) defined as Mw/Mn is 3.3 to 4.0, wherein Mw is a weight average molecular weight, and Mn is a number average molecular weight.

5. The polyolefin according to claim 1, wherein dart drop impact strength measured according to ASTM D 1709, Method A, after preparing a polyolefin film having BUR 2.3, and a film thickness of 55 to 65 μm using a film applicator, is 1,500 g or more.

6. The polyolefin according to claim 1, wherein the polyolefin comprises a copolymer of ethylene and an alpha olefin.

7. The polyolefin according to claim 6, wherein the alpha olefin comprises one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbordene, phenyl norbordene, vinyl norbordene, dicyclopentadiene, 1,4-butadiene, 1,5-pentadiene, 1,6-hexadiene, styrene, alpha-methyl styrene, divinylbenzene, and 3-chloromethyl styrene.

8. The polyolefin according to claim 1, wherein the polyolefin is prepared by polymerizing olefin monomers, in the presence of a hybrid supported metallocene catalyst comprising one or more first metallocene compounds selected from compounds represented by Chemical Formula 1; one or more second metallocene compounds selected from compounds represented by Chemical Formula 2; and a carrier supporting the first and second metallocene compounds:

[Chemical Formula 1]

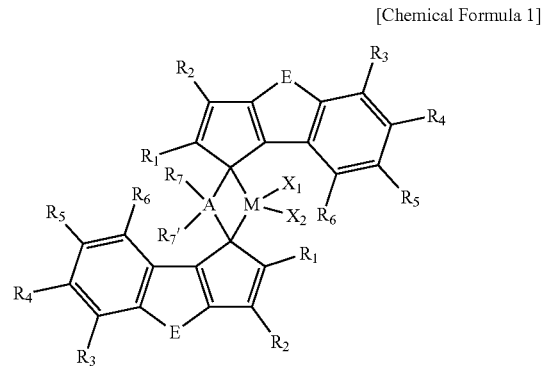

wherein in the Chemical Formula 1,

M is a Group 4 transition metal, $X_1$ and $X_2$ are identical to or different from each other, and are each independently, hydrogen, halogen, $C_{1-20}$ alkyl, or QCOO—, and Q is $C_{1-20}$ alkyl, A is carbon, silicon or germanium, $R_1$ and $R_2$ are identical to or different from each other, and are each independently, $C_{1-20}$ alkyl, $C_{2-20}$ alkenyl, $C_{6-30}$ aryl, R$_3$ to R$_6$ are identical to or different from each other, and are each independently, hydrogen, C$_{1-20}$ alkyl, C$_{2-20}$ alkenyl, C$_{6-30}$ aryl, C$_{7-30}$ alkylaryl, or C$_{7-30}$ arylalkyl, R$_7$ and R$_7$' are identical to or different from each other, and are each independently, C$_{1-20}$ alkyl, C$_{2-20}$ alkenyl, C$_{6-30}$ aryl, or C$_{2-20}$ alkoxy alkyl, and E is one selected from the group consisting of sulfur(S), oxygen (O) and selenium (Se),

[Chemical Formula 2]

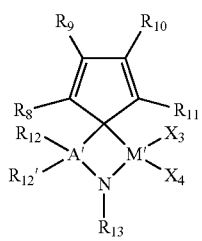

wherein in Chemical Formula 2,

M' is a Group 4 transition metal,

A' is carbon, silicon or germanium,

X$_3$ and X$_4$ are identical to or different from each other, and are each independently, halogen, or C$_{1-20}$ alkyl, R$_8$ to R$_{11}$ are identical to or different from each other, and are each independently, hydrogen, C$_{1-20}$ alkyl, C$_{2-20}$ alkenyl, C$_{6-20}$ aryl, C$_{7-20}$ alkylaryl, C$_{7-20}$ arylalkyl, or two or more neighboring substituents of R$_8$ to R$_{11}$ are linked to each other to form a substituted or unsubstituted aliphatic ring, aromatic ring, or hetero aromatic ring comprising one or more selected from the group consisting of N, O and S, R$_{12}$ and R$_{12}$' are identical to or different from each other, and are each independently, C$_{1-20}$ alkyl, C$_{2-20}$ alkenyl, C$_{6-30}$ aryl, or C$_{2-20}$ alkoxy alkyl, and R$_{13}$ is C$_{1-20}$ alkyl, C$_{2-20}$ alkenyl, or C$_{6-30}$ aryl.

9. The polyolefin according to claim 8, wherein the compound represented by Chemical Formula 1 is one selected from compounds represented by the following structural formulas:

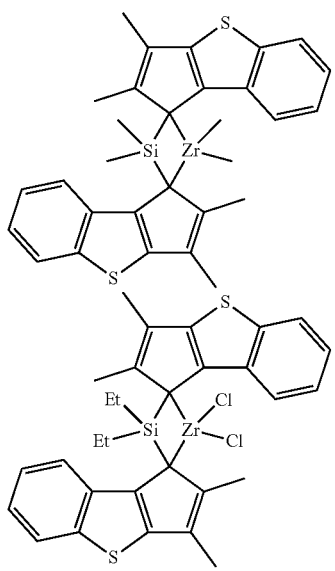

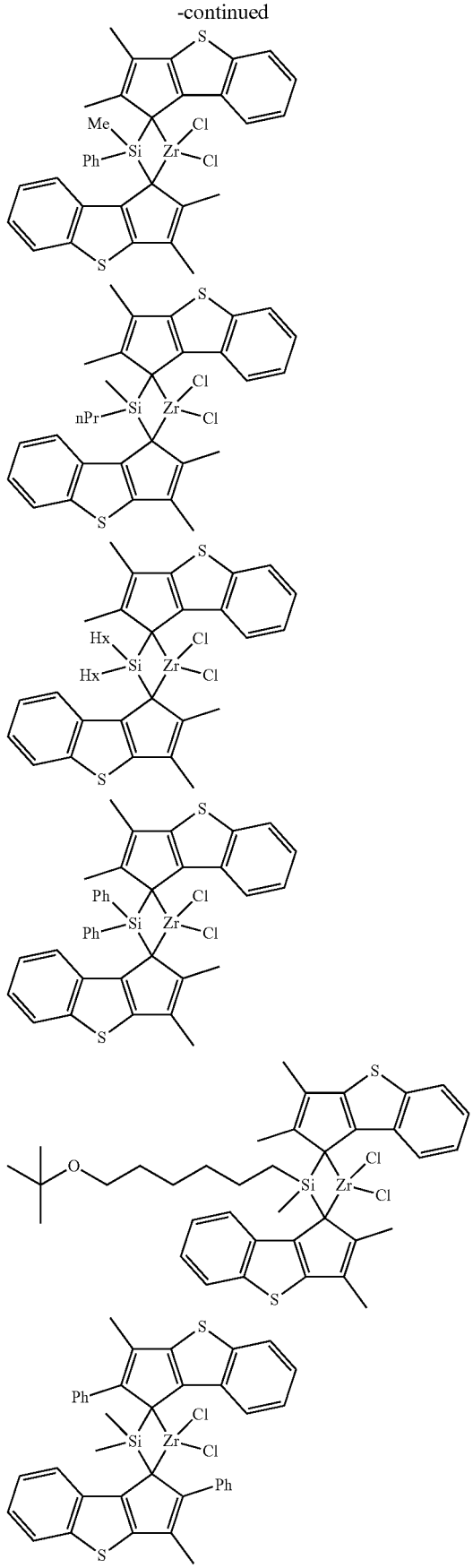

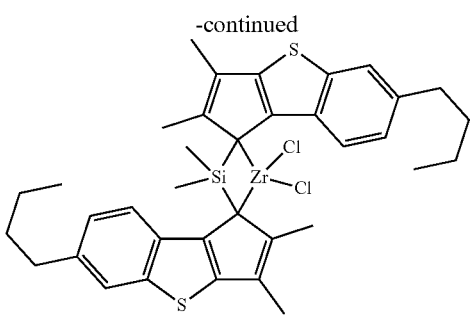
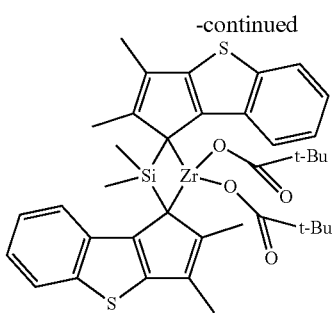
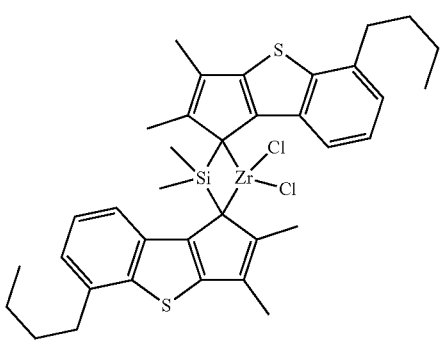
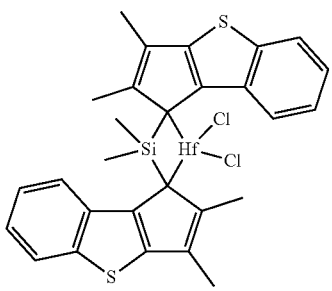
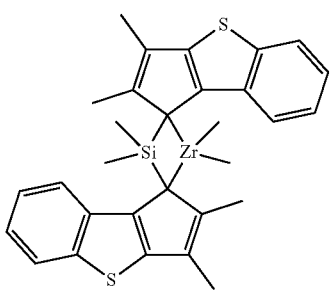
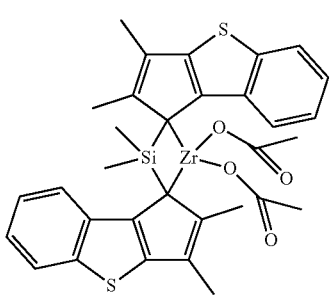
wherein in the structural formulas,
Me denotes methyl,
Et denotes ethyl,
nPr denotes n-propyl,
Hx denotes n-hexyl,
Ph denotes phenyl, and
t-Bu denotes tert-butyl.
10. The polyolefin according to claim 8, wherein the compound represented by Chemical Formula 2 is one selected from compounds represented by the following structural formulas:
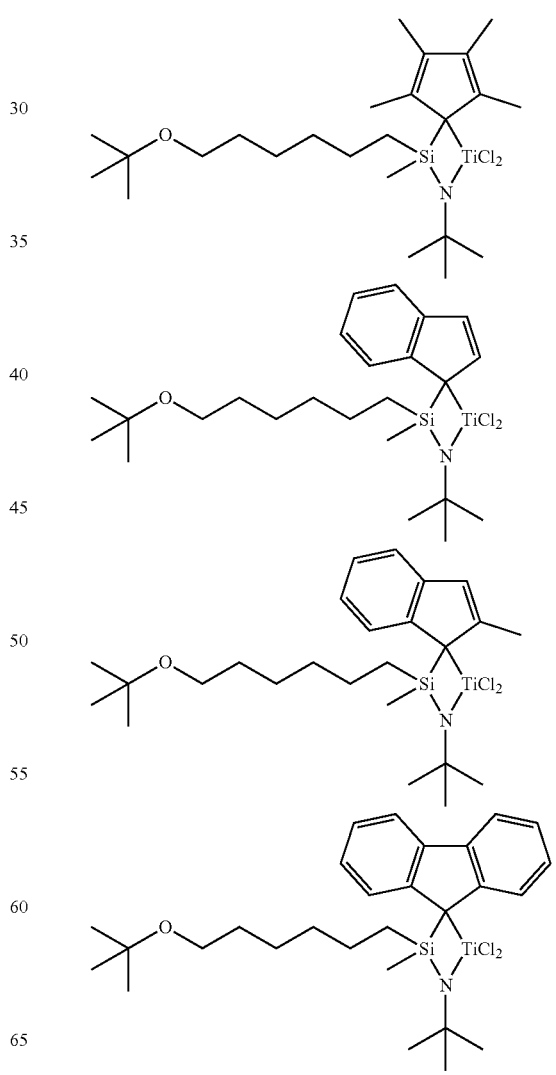

-continued
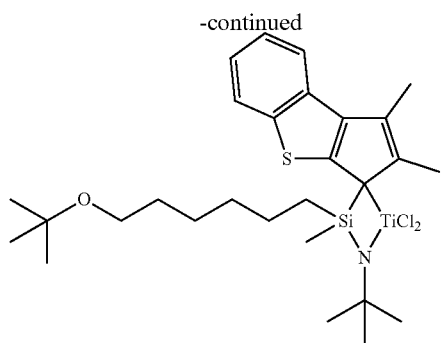
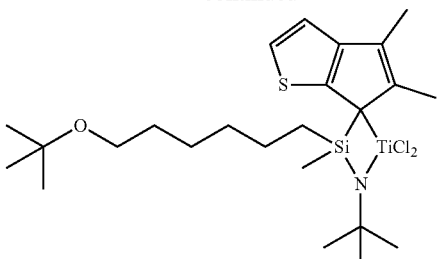
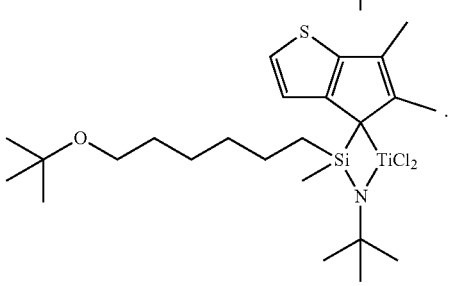
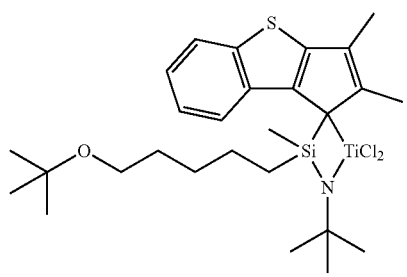
11. The polyolefin according to claim 8, wherein a mole ratio of the first and second metallocene compounds is 1:1 to 1:10.
12. The polyolefin according to claim 8, wherein the carrier comprises silica, alumina, magnesia, or a mixture thereof.
* * * * *